(12) United States Patent
Li et al.

(10) Patent No.: US 12,158,166 B2
(45) Date of Patent: Dec. 3, 2024

(54) SELF-PRIMING APPARATUS FOR QUICK NO-WATER STARTUP

(71) Applicant: Jiangsu University, Jiangsu (CN)

(72) Inventors: Xiaowei Li, Jiangsu (CN); Hao Chang, Jiangsu (CN); Jialin Du, Jiangsu (CN); Guangjie Peng, Jiangsu (CN); Weidong Shi, Jiangsu (CN); Shiming Hong, Jiangsu (CN)

(73) Assignee: Jiangsu University, Jiangsu (CN)

( * ) Notice: Subject to any disclaimer, the term of this patent is extended or adjusted under 35 U.S.C. 154(b) by 9 days.

(21) Appl. No.: 17/914,366

(22) PCT Filed: Nov. 1, 2021

(86) PCT No.: PCT/CN2021/127816
§ 371 (c)(1),
(2) Date: Sep. 26, 2022

(87) PCT Pub. No.: WO2023/070642
PCT Pub. Date: May 4, 2023

(65) Prior Publication Data
US 2023/0313801 A1 Oct. 5, 2023

(30) Foreign Application Priority Data
Oct. 28, 2021 (CN) .......................... 202111264012.1

(51) Int. Cl.
*F04D 9/02* (2006.01)
*B01D 19/00* (2006.01)

(52) U.S. Cl.
CPC ............ *F04D 9/02* (2013.01); *B01D 19/0036* (2013.01); *B01D 19/0052* (2013.01)

(58) Field of Classification Search
None
See application file for complete search history.

(56) References Cited

U.S. PATENT DOCUMENTS 2,620,733 A * 12/1952 Overbeke ............. F01B 1/0672
277/912
3,578,880 A * 5/1971 Cygnor .................. F04D 9/043
417/199.2
(Continued)

FOREIGN PATENT DOCUMENTS

CN 105927558 9/2016
CN 108894992 * 11/2018
(Continued)

OTHER PUBLICATIONS

Machine Translation of CN-108894992 (Obtained at USPTO Search, Clarivate Analytics 2023) (Year: 2023).*
(Continued)

*Primary Examiner* — Essama Omgba
*Assistant Examiner* — Geoffrey S Lee
(74) *Attorney, Agent, or Firm* — JCIPRNET

(57) ABSTRACT

A self-priming apparatus for quick no-water startup includes a front-stage inlet chamber, a middle-stage gas-liquid separation chamber, and a rear-stage gas-liquid separation chamber. A plurality of two-stage chamber gas-liquid separation one-way channels are symmetrically arranged between adjacent chambers of the front-stage inlet chamber, the middle-stage gas-liquid separation chamber and the rear-stage gas-liquid separation chamber. A plurality of one-way outlets are symmetrically arranged in an inner cavity of the rear-stage gas-liquid separation chamber. By decreasing or increasing the volumes of an outer cavity and an inner cavity of the front-stage inlet chamber, water is sucked in due to pressure difference and water intake and preliminary gas-liquid separation are carried out. The middle-stage gas-liquid separation chamber is configured for gas-liquid separation. By decreasing or increasing the volume of the inner cavity of the rear-stage gas-liquid separation chamber, water is rap- (Continued)

idly expelled due to pressure difference and gas-liquid separation is carried out.

10 Claims, 8 Drawing Sheets

(56) References Cited

U.S. PATENT DOCUMENTS

| | | | | |
|---|---|---|---|---|
| 4,035,104 A * | 7/1977 | Buse | ............... | F04D 9/043 |
| | | | | 417/202 |
| 4,645,428 A * | 2/1987 | Arregui | ............ | F04B 27/053 |
| | | | | 417/273 |
| 2006/0064954 A1 | 5/2006 | Yokota et al. | | |
| 2022/0120280 A1* | 4/2022 | Li | ............ | F04D 9/043 |
| 2022/0325716 A1* | 10/2022 | Li | ............ | F04D 9/02 |
| 2023/0243355 A1* | 8/2023 | Peng | ............ | F04C 2/00 |
| | | | | 96/220 |
| 2023/0265850 A1* | 8/2023 | Peng | ............ | F04D 1/00 |
| | | | | 415/56.1 |
| 2023/0313801 A1* | 10/2023 | Li | ............ | F04D 9/006 |
| | | | | 415/56.1 |

FOREIGN PATENT DOCUMENTS

| | | | | | |
|---|---|---|---|---|---|
| CN | 108894992 A | * | 11/2018 | ............ | F04D 13/06 |
| CN | 110397599 | | 11/2019 | | |
| CN | 113107858 | | 7/2021 | | |
| CN | 113464450 | | 10/2021 | | |
| CN | 113464450 A | * | 10/2021 | ............ | F04D 1/00 |
| CN | 114087205 A | * | 2/2022 | ............ | B01D 19/0036 |
| CN | 114934904 A | * | 8/2022 | | |
| CN | 115163501 A | * | 10/2022 | ............ | B01D 49/00 |
| CN | 115182884 A | * | 10/2022 | ............ | F04D 15/0005 |
| CN | 116085271 A | * | 5/2023 | | |
| GB | 190929261 A | * | 11/1909 | | |
| GB | 216570 A | * | 2/1923 | | |

OTHER PUBLICATIONS

Machine Translation of CN108894992 (Obtained from USPTO Search) (Year: 2024).*
Machine Translation of CN116085271 (Obtained from USPTO Search) (Year: 2024).*
Machine Translation of CN114087205 (Obtained from USPTO Search) (Year: 2024).*
Machine Translation CN116085271 (Obtained from USPTO Search) (Year: 2024).*
Machine Translation CN115182884 (Obtained from USPTO Search) (Year: 2024).*
Machine Translation CN113464450 (Obtained from USPTO Search) (Year: 2024).*
Machine Translation CN114934904 (Obtained from USPTO Search) (Year: 2024).*
Machine Translation CN115163501 (Obtained from USPTO Search) (Year: 2024).*
"International Search Report (Form PCT/ISA/210) of PCT/CN2021/127816," mailed on Apr. 26, 2022, pp. 1-4.
"Written Opinion of the International Searching Authority (Form PCT/ISA/237) of PCT/CN2021/127816," mailed on Apr. 26, 2022, pp. 1-3.

* cited by examiner

SELF-PRIMING APPARATUS FOR QUICK NO-WATER STARTUP

CROSS-REFERENCE TO RELATED APPLICATION

This application is a 371 of international application of PCT application serial no. PCT/CN2021/127816, filed on Nov. 1, 2021, which claims the priority benefit of China application no. 202111264012.1, filed on Oct. 28, 2021. The entirety of each of the above-mentioned patent applications is hereby incorporated by reference herein and made a part of this specification.

TECHNICAL FIELD

The present disclosure belongs to the field of self-priming apparatuses for quick no-water startup, and in particular, relates to a self-priming apparatus for quick no-water startup.

BACKGROUND

Centrifugal pumps are widely used in agricultural irrigation, industrial fluid transportation, and other fields. Before a centrifugal pump is started, its chamber is initially filled with air and the generated centrifugal force is insufficient for water delivery due to light weight of the air. Therefore, the centrifugal pump needs to be filled with water before startup, and this operation is complex and time-consuming. If an external vacuum pump is configured for evacuation, the energy consumption is high, and the residual air may cause cavitation and damage the components of the pump.

SUMMARY OF DISCLOSURE

To eliminate the defects in the prior art, the present disclosure provides a self-priming apparatus for quick no-water startup. The apparatus is mounted on an inlet pipe of a centrifugal pump and is low in energy consumption and convenient to operate. The apparatus after being started can quickly complete the processes of air intake, air exhaust, and filling the chamber with water through its own structure. Meanwhile, layer-by-layer gas-liquid separation also ensures that air is completely expelled, which reduces the probability of cavitation in the pump. Finally, the apparatus stops running and seals water inside through its own structure, so that the apparatus is always filled with water. The centrifugal pump can directly enter a normal operating condition when it is restarted, and thus the working efficiency is significantly improved.

The present disclosure achieves the above objective through the following technical means.

A self-priming apparatus for quick no-water startup is provided, which includes a structure of a symmetrical cylinder and includes a front-stage inlet chamber, a middle-stage gas-liquid separation chamber, and a rear-stage gas-liquid separation chamber;

a plurality of two-stage chamber gas-liquid separation one-way channels are symmetrically arranged between adjacent chambers of the front-stage inlet chamber, the middle-stage gas-liquid separation chamber and the rear-stage gas-liquid separation chamber, a plurality of one-way outlets are symmetrically arranged in an inner cavity of the rear-stage gas-liquid separation chamber, and fixed supports are respectively arranged on bottom sides of the front-stage inlet chamber, the middle-stage gas-liquid separation chamber, and the rear-stage gas-liquid separation chamber;

by decreasing or increasing volumes of an outer cavity and an inner cavity of the front-stage inlet chamber, water is sucked in due to a pressure difference and a water intake and a preliminary gas-liquid separation are carried out;

the middle-stage gas-liquid separation chamber is configured for a gas-liquid separation; and by decreasing or increasing a volume of the inner cavity of the rear-stage gas-liquid separation chamber, water is rapidly expelled due to a pressure difference and a water discharge and a gas-liquid separation are carried out.

The front-stage inlet chamber is sequentially provided from outside to inside with inlets, an outer casing wall of the front-stage inlet chamber, gas-liquid separation type one-way channels, an inner casing wall of the front-stage inlet chamber, a plurality of gas-liquid separation one-way openings, two-stage pushing shaft rods, and a wheel-type impeller; the middle-stage gas-liquid separation chamber is sequentially provided from outside to inside with an outer casing wall of the middle-stage gas-liquid separation chamber, a plurality of magnetically slidable chamber partition plates, an inner casing wall of the middle-stage gas-liquid separation chamber, gas-liquid separation shafts, gas-liquid separation channels, and a hexagonal impeller; the rear-stage gas-liquid separation chamber is sequentially provided from outside to inside with an outer casing wall of the rear-stage gas-liquid separation chamber, a plurality of inner and outer casing wall connecting devices, an inner casing wall of the rear-stage gas-liquid separation chamber, contraction-type gas-liquid separation rotating shaft rods, gas-liquid separation extension channels, and a triangular impeller; and the two-stage chamber gas-liquid separation one-way channels are arranged between the adjacent chambers.

Further, the inlets include two inlets and are symmetrically arranged on the outer casing wall of the front-stage inlet chamber, and a gas-liquid separation type one-way channel of the gas-liquid separation type one-way channels is arranged at a joint between each of the inlets and the outer casing wall of the front-stage inlet chamber; rotating shafts of the gas-liquid separation type one-way channel, cover plates of the gas-liquid separation type one-way channel, and rubber connectors of the gas-liquid separation type one-way channel are symmetrically arranged on two sides of each of the gas-liquid separation type one-way channels, and first-stage springs, fixed shaft rods, and impellers built in the fixed shaft rods are asymmetrically arranged on the two sides of each of the gas-liquid separation type one-way channels, wherein each of the cover plates of the gas-liquid separation type one-way channel is a rotatable cover plate and rotates along with a respective one of the rotating shafts of the gas-liquid separation type one-way channel, each of the rubber connectors of the gas-liquid separation type one-way channel is arranged on a top end of a respective one of the cover plates of the gas-liquid separation type one-way channel, the fixed shaft rods are arranged on the inner casing wall of the front-stage inlet chamber, and the first-stage springs are respectively connected to the cover plates of the gas-liquid separation type one-way channel and the fixed shaft rods;

the gas-liquid separation one-way openings are symmetrically arranged on the inner casing wall of the front-stage inlet chamber; first-stage rotating shafts of each of the gas-liquid separation one-way openings, second-stage rotating shafts of each of the gas-liquid separation one-way openings, cover plates of each of the gas-liquid separation one-way openings, rubber connectors of each of the gas-liquid separation one-way openings, rotating shaft rods, impellers built in the rotating shaft rods, second-stage springs, a first wall pipe, first pushing shafts, and a third-stage spring are symmetrically arranged on two sides of each of the gas-liquid separation one-way openings, wherein each of the cover plates of each of the gas-liquid separation one-way openings is a rotatable cover plate and rotates about a respective one of the second-stage rotating shafts of each of the gas-liquid separation one-way openings, the rotating shaft rods rotate about the first-stage rotating shafts of each of the gas-liquid separation one-way openings, respectively, the second-stage springs are respectively connected to the cover plates of each of the gas-liquid separation one-way openings and the rotating shaft rods, the first pushing shafts are respectively connected to the rotating shaft rods and the third-stage spring, and the first pushing shafts and the third-stage spring are arranged in the first wall pipe;

a plurality of front-stage wall surface expansion devices are evenly arranged in the outer casing wall of the front-stage inlet chamber and the inner casing wall of the front-stage inlet chamber; each of the front-stage wall surface expansion devices is provided with a second wall pipe, a fourth-stage spring, and second pushing shafts symmetrically arranged on two sides of the fourth-stage spring, wherein the second pushing shafts are connected to the fourth-stage spring and the wall surface, and the fourth-stage spring and the second pushing shafts are arranged in the second wall pipe;

the two-stage pushing shaft rods include three two-stage pushing shaft rods and are fixedly arranged in the front-stage inlet chamber; each of the two-stage pushing shaft rods is provided with a telescopic slide rail, a first-stage baffle, a fifth-stage spring, a second-stage baffle, a fixed baffle, and a pushing shaft rod, and rotating shafts of each of the two-stage pushing shaft rods and outer casing walls of each of the two-stage pushing shaft rods are symmetrically arranged on two sides of each of the two-stage pushing shaft rods, wherein the outer casing walls of each of the two-stage pushing shaft rods are connected to the inner casing wall of the front-stage inlet chamber; the rotating shafts of each of the two-stage pushing shaft rods are respectively connected to the outer casing walls of each of the two-stage pushing shaft rods and the telescopic slide rail; the telescopic slide rail is configured for being extended or retracted freely; the first-stage baffle is a movable baffle and is located on a top of the telescopic slide rail; the first-stage baffle is configured for sliding in each of the two-stage pushing shaft rods and is connected to the fifth-stage spring; the second-stage baffle is a movable baffle and is configured for sliding in each of the two-stage pushing shaft rods, and the second-stage baffle is connected to the fifth-stage spring and the pushing shaft rod; the pushing shaft rod is connected to the outer casing wall of the front-stage inlet chamber; and the fixed baffle is fixedly arranged in each of the two-stage pushing shaft rods; and the wheel-type impeller is provided with fixed wheels and an external drive shaft of the wheel-type impeller, wherein the fixed wheels include three fixed wheels and are respectively arranged at convex sections of the wheel-type impeller, and the external drive shaft of the wheel-type impeller is externally connected to a motor and is driven by the motor in reverse rotation; and the fixed supports are respectively arranged on the bottom sides of the front-stage inlet chamber, the middle-stage gas-liquid separation chamber, and the rear-stage gas-liquid separation chamber.

Further, the gas-liquid separation one-way openings include six gas-liquid separation one-way openings on the inner casing wall of the front-stage inlet chamber and are symmetrically arranged with respect to the front-stage inlet chamber; two adjacent ones of the gas-liquid separation one-way openings form an angle of 60°.

Further, the front-stage wall surface expansion devices include three front-stage wall surface expansion devices on the outer casing wall of the front-stage inlet chamber and three front-stage wall surface expansion devices on the inner casing wall of the front-stage inlet chamber; the three front-stage wall surface expansion devices on the inner casing wall are respectively arranged at positions corresponding to positions at which the three front-stage wall surface expansion devices on the outer casing wall are arranged, and two adjacent ones of the front-stage wall surface expansion devices form an angle of 120°.

Further, a first slide rail is arranged on an inner side of the outer casing wall of the middle-stage gas-liquid separation chamber; a second slide rail is arranged on an outer side of the inner casing wall of the middle-stage gas-liquid separation chamber, and a third slide rail is arranged on an inner side of the inner casing wall of the middle-stage gas-liquid separation chamber; a plurality of impellers built in the inner casing wall of the middle-stage gas-liquid separation chamber are symmetrically arranged in the inner casing wall of the middle-stage gas-liquid separation chamber;

the magnetically slidable chamber partition plates are evenly arranged between the outer casing wall of the middle-stage gas-liquid separation chamber and the inner casing wall of the middle-stage gas-liquid separation chamber; each of the magnetically slidable chamber partition plates is provided with a fixed partition plate, an impeller built in the fixed partition plate, a sixth-stage spring, an impeller built in a slidable partition plate, the slidable partition plate, and rollers on two sides of the slidable partition plate, wherein the fixed partition plate is connected to the first slide rail and the second slide rail, and divides an outer cavity of the middle-stage gas-liquid separation chamber; the sixth-stage spring is connected to the fixed partition plate and the slidable partition plate; the slidable partition plate is connected to the rollers on the two sides of the slidable partition plate, and slides via the rollers and divides the outer cavity of the middle-stage gas-liquid separation chamber; the rollers on the two sides of the slidable partition plate slide along the first slide rail and the second slide rail, respectively; the rollers are magnetized and are attracted to first wheels of the gas-liquid separation shafts which are magnetized;

the gas-liquid separation shafts include three gas-liquid separation shafts, namely a first gas-liquid separation shaft, a second gas-liquid separation shaft, and a third gas-liquid separation shaft, and divide an inner cavity of the middle-stage gas-liquid separation chamber; each of the gas-liquid separation shafts is provided with first wheels of each of the gas-liquid separation shafts, impellers built in a disc-type rolling device, seventh-stage springs, second wheels of each of the gas-liquid separation shafts, a first impeller of each of the gas-liquid separation shafts, a second impeller of each of the gas-liquid separation shafts, a third impeller of each of the gas-liquid separation shafts, the disc-type rolling device, and an arm rod of each of the gas-liquid separation shafts; first baffles of each of the gas-liquid separation shafts are symmetrically arranged on two sides of the first wheels of each of the gas-liquid separation shafts, respectively, and second baffles of each of the gas-liquid separation shafts are symmetrically arranged on two sides of the second wheels of each of the gas-liquid separation shafts, respectively; the first wheels of each of the gas-liquid separation shafts slide along the third slide rail and are connected to the first baffles of each of the gas-liquid separation shafts on the two sides of the first wheels; the first wheels of the gas-liquid separation shafts which are magnetized include only the first wheels of one of the three gas-liquid separation shafts; the first baffles of each of the gas-liquid separation shafts on the two sides of the first wheels are connected to the disc-type rolling device; the impellers built in the disc-type rolling device include three impellers and are evenly built in the disc-type rolling device, and the seventh-stage springs correspondingly include three seventh-stage springs and are correspondingly arranged in the disc-type rolling device; the second wheels slide along an edge of the disc-type rolling device and are arranged symmetrically with the first wheels of each of the gas-liquid separation shafts; the second baffles of each of the gas-liquid separation shafts are connected to the second wheels of each of the gas-liquid separation shafts and the disc-type rolling device; the disc-type rolling device rotates with the hexagonal impeller and is enabled to roll by the first wheels of each of the gas-liquid separation shafts and the second wheels of each of the gas-liquid separation shafts; the first impeller of each of the gas-liquid separation shafts, the second impeller of each of the gas-liquid separation shafts, and the third impeller of each of the gas-liquid separation shafts are arranged in the arm rod of each of the gas-liquid separation shafts;

three layers of the gas-liquid separation channels are arranged, wherein two ends of a third layer of the three layers are connected to the third impeller of the first gas-liquid separation shaft and the third impeller of the second gas-liquid separation shaft, respectively; two ends of a second layer of the three layers are connected to the second impeller of the second gas-liquid separation shaft and the second impeller of the third gas-liquid separation shaft, respectively; and two ends of a first layer of the three layers are connected to the first impeller of the third gas-liquid separation shaft and the first impeller of the first gas-liquid separation shaft, respectively; the three layers of the gas-liquid separation channels are each provided with a ninth-stage spring, impellers built in each of the gas-liquid separation channels and eighth-stage springs are sequentially and symmetrically connected on two sides of the ninth-stage spring, respectively, and the other side of each of the eighth-stage springs is connected to a respective one of the first impeller, the second impeller and the third impeller in the arm rod of a respective one of the gas-liquid separation shafts; the hexagonal impeller runs coaxially in an identical direction with the wheel-type impeller and performs a reverse rotation.

Further, the impellers built in the inner casing wall of middle-stage gas-liquid separation chamber include four impellers built in the inner casing wall of the middle-stage gas-liquid separation chamber and are symmetrically arranged with respect to the middle-stage gas-liquid separation chamber; two adjacent ones of the impellers built in the inner casing wall of the middle-stage gas-liquid separation chamber form an angle of 90°.

Further, the magnetically slidable chamber partition plates include four magnetically slidable chamber partition plates and are arranged in the middle-stage gas-liquid separation chamber and are evenly distributed along a periphery of the middle-stage gas-liquid separation chamber; two adjacent ones of the magnetically slidable chamber partition plates form an angle of 90°.

Further, the inner and outer casing wall connecting devices are symmetrically arranged between the outer casing wall of the rear-stage gas-liquid separation chamber and the inner casing wall of the rear-stage gas-liquid separation chamber, wherein an impeller built in each of the inner and outer casing wall connecting devices is arranged in a fixed shaft rod of each of the inner and outer casing wall connecting devices, and two ends of the fixed shaft rod of each of the inner and outer casing wall connecting devices are connected to the inner casing wall and the outer casing wall through tenth-stage springs, respectively;

a plurality of rear-stage inner casing wall expansion devices are evenly arranged in the inner casing wall of the rear-stage gas-liquid separation chamber; each of the rear-stage inner casing wall expansion devices is provided with a third wall pipe, an eleventh-stage spring, and third pushing shafts symmetrically arranged on two sides of the eleventh-stage spring, wherein the eleventh-stage spring and the third pushing shafts are arranged in the third wall pipe;

a plurality of impellers built in the inner casing wall of the rear-stage gas-liquid separation chamber are symmetrically and evenly distributed in the inner casing wall of the rear-stage gas-liquid separation chamber; a contraction-type slideway is arranged on an inner side of the inner casing wall of the rear-stage gas-liquid separation chamber; two magnets built in a surface of the inner casing wall of the rear-stage gas-liquid separation chamber are provided and are symmetrically arranged about a lower-side one of the impellers built in the inner casing wall of the rear-stage gas-liquid separation chamber; the two magnets built in the surface of the inner casing wall of the rear-stage gas-liquid separation chamber each form an angle of 30° with the lower-side one of the impellers built in the inner casing wall of the rear-stage gas-liquid separation chamber, and repel a magnet built in a rotatable arm rod;

the contraction-type gas-liquid separation rotating shaft rods include three contraction-type gas-liquid separation rotating shaft rods and divide the inner cavity of the rear-stage gas-liquid separation chamber; each of the contraction-type gas-liquid separation rotating shaft rods is provided with shaft beads, a trapezoidal slidable device, a front-stage impeller, a twelfth-stage spring, a rear-stage impeller, and the rotatable arm rod, wherein a first impeller in the rotatable arm rod, the magnet built in the rotatable arm rod, and a second-stage impeller in the rotatable arm rod are sequentially arranged toward an axial center in the rotatable arm rod; two sides of the magnet built in the rotatable arm rod are connected to the first impeller in the rotatable arm rod and the second-stage impeller in the rotatable arm rod through thirteenth-stage springs, respectively; the shaft beads are arranged in the trapezoidal slidable device and are configured for sliding along the contraction-type slideway; the twelfth-stage spring is arranged in the trapezoidal slidable device; the front-stage impeller and the rear-stage impeller are arranged at two sides of the twelfth-stage spring, respectively; and the front-stage impeller is arranged at a front end of the trapezoidal slidable device in a moving direction, and the rear-stage impeller is arranged at a rear end of the trapezoidal slidable device in the moving direction;

the gas-liquid separation extension channels include three gas-liquid separation extension channels, and two ends of each of the gas-liquid separation extension channels are connected to the first impeller in the rotatable arm rod and the second-stage impeller in an adjacent rotatable arm rod to the rotatable arm rod, respectively; each of the gas-liquid separation extension channels is provided with an impeller built in each of the gas-liquid separation extension channels, and two sides of the impeller built in each of the gas-liquid separation extension channels are connected to the first impeller in the rotatable arm rod and the second-stage impeller in the adjacent rotatable arm rod to the rotatable arm rod through sixteenth-stage springs, respectively;

the triangular impeller is provided with top rotating shafts and fifteenth-stage springs, wherein the top rotating shafts include three top rotating shafts and are arranged at three vertices of the triangular impeller; the fifteenth-stage springs include three fifteenth-stage springs and are respectively connected to the contraction-type gas-liquid separation rotating shaft rods and the triangular impeller; the triangular impeller runs coaxially in an identical direction with the wheel-type impeller and performs a reverse rotation.

Further, the inner and outer casing wall connecting devices include four inner and outer casing wall connecting devices provided in the rear-stage gas-liquid separation chamber and are symmetrically arranged with respect to the rear-stage gas-liquid separation chamber; two adjacent ones of the inner and outer casing wall connecting devices form an angle of 90°.

Further, the rear-stage inner casing wall expansion devices include four rear-stage inner casing wall expansion devices up-and-down symmetrically arranged in the inner casing wall of the rear-stage gas-liquid separation chamber and two adjacent ones of the rear-stage inner casing wall expansion devices form an angle of 90°; the impellers built in the inner casing wall of the rear-stage gas-liquid separation chamber include four impellers built in the inner casing wall of the rear-stage gas-liquid separation chamber and are symmetrically arranged with respect to the rear-stage gas-liquid separation chamber, and two adjacent ones of the impellers built in the inner casing wall of the rear-stage gas-liquid separation chamber form an angle of 90°;

a plurality of two-stage chamber gas-liquid separation one-way channels are symmetrically arranged between the adjacent chambers; one-way channel fixed shafts, one-way channel built-in impellers, one-way channel fixed partition plates, seventeenth-stage springs, one-way channel rotating shafts, one-way channel cover plates, and one-way channel rubber connectors are symmetrically arranged on two sides of each of the two-stage chamber gas-liquid separation one-way channels, wherein the one-way channel fixed shafts are respectively connected to the one-way channel fixed partition plates, the seventeenth-stage springs are respectively connected to the one-way channel fixed shafts and the one-way channel cover plates, the one-way channel rotating shafts are respectively connected to the one-way channel cover plates, and the one-way channel cover plates rotate about the one-way channel rotating shafts, respectively, and each of the one-way channel rubber connectors is arranged on a top end of a respective one of the one-way channel cover plates;

a plurality of one-way outlets are symmetrically arranged in the rear-stage gas-liquid separation chamber and are each provided with springs, rotating shafts, rubber connectors, and cover plates, wherein the cover plates are each a rotatable cover plate, and respectively rotate about the rotating shafts, the springs are respectively connected to the cover plates, and each of the rubber connectors is arranged on a top end of a respective one of the cover plates.

Further, the two-stage chamber gas-liquid separation one-way channels include two pairs of two-stage chamber gas-liquid separation one-way channels, each of the two pairs includes two two-stage chamber gas-liquid separation one-way channels symmetrically arranged with respect to a respective one of the front-stage inlet chamber and the middle-stage gas-liquid separation chamber; the one-way outlets include two one-way outlets and are symmetrically arranged with respect to the rear-stage gas-liquid separation chamber.

Further, each of the gas-liquid separation channels and an adjacent one of the gas-liquid separation shafts are welded into one piece in the middle-stage gas-liquid separation chamber; and each of the gas-liquid separation extension channels and an adjacent one of the contraction-type gas-liquid separation rotating shaft rods are welded into one piece in the rear-stage gas-liquid separation chamber.

Further, an inner cavity radius of the front-stage inlet chamber is an outer cavity radius of the middle-stage gas-liquid separation chamber, and an inner cavity radius of the middle-stage gas-liquid separation chamber is an outer cavity radius of the rear-stage gas-liquid separation chamber; an outer cavity radius of the front-stage inlet chamber, the outer cavity radius of the middle-stage gas-liquid separation chamber, and the outer cavity radius of the rear-stage gas-liquid separation chamber are in a ratio of 3:2:1.

In the present disclosure, the springs have high elasticity and the partition plates have good separation effects; the wheels, rollers, and shaft beads have smooth surfaces and produce small friction; and the corresponding positions of the built-in impellers allow the fluid to pass freely.

The present disclosure has the following beneficial effects.

1. The present disclosure adopts the combination of the front-stage inlet chamber, the middle-stage gas-liquid separation chamber, and the rear-stage gas-liquid separation chamber. The chambers are connected through the two-stage chamber gas-liquid separation one-way channels. Each of the two-stage chamber gas-liquid separation one-way channels is provided with the rubber connectors to ensure the sealing performance. Besides, each of the chambers is provided with the gas-liquid separation devices which are driven by the drive shaft to fully realize gas-liquid separation and water intake layer by layer, so that the air content in water is reduced and the probability of cavitation in the pump is reduced subsequently.

2. The present disclosure adopts the two-stage pushing shaft rods. The shaft rods are connected to the outer cavity and the inner cavity of the front-stage inlet chamber. The impeller designed in this specification has the concave and convex sections and the fixed wheels are provided at the convex sections. When the impeller rotates, the fixed wheels periodically contact the two-stage pushing shaft rods due to the periodic switching between the concave and convex sections, so that the volumes of the outer cavity and the inner cavity of the front-stage inlet chamber increase periodically, water is rapidly sucked in and air is expelled under the pressure difference caused by the periodic changes in the volumes, and gas-liquid separation in the early stage is carried out through the gas-liquid separation type one-way channels and the gas-liquid separation one-way openings.

3. The present disclosure adopts the disc-type rolling device which is driven by the gas-liquid separation shaft to roll. Since the impellers and the springs are provided in the disc-type rolling device, the peripheral gas and liquid in the inner cavity of the middle-stage gas-liquid separation chamber are separated during the rolling process. Meanwhile, the magnetized first wheels of the gas-liquid separation shaft are attracted to the magnetically slidable chamber partition plate and they cooperate to carry out gas-liquid separation in the outer cavity and push the gas and liquid in the outer cavity to enter the inner cavity. The central gas and liquid in the inner cavity are separated by the three impellers arranged in each of the gas-liquid separation shafts in the inner cavity and the correspondingly arranged gas-liquid separation channels.

4. The present disclosure adopts the contraction-type gas-liquid separation rotating shaft rods, and the shaft rods are connected to the triangular impeller through the springs. When the impeller rotates, the springs are stretched due to the centrifugal effect, the inner casing wall of the rear-stage gas-liquid separation chamber expands, and gas and liquid are more rapidly sucked in from the front-stage inlet chamber and the middle-stage gas-liquid separation chamber. Meanwhile, since the magnets built in the arm rods repel the magnets built in the wall surface of the inner casing wall of the rear-stage gas-liquid separation chamber, the stretched springs are rapidly compressed, the inner casing wall of the rear-stage gas-liquid separation chamber contracts, and the gas-liquid separation devices arranged in the inner cavity operate to accelerate air expelling from the inner cavity, so that the gas-liquid separation efficiency of the whole apparatus is improved and water is filled into the chambers more rapidly.

DESCRIPTION OF EMBODIMENTS

Figure 1:
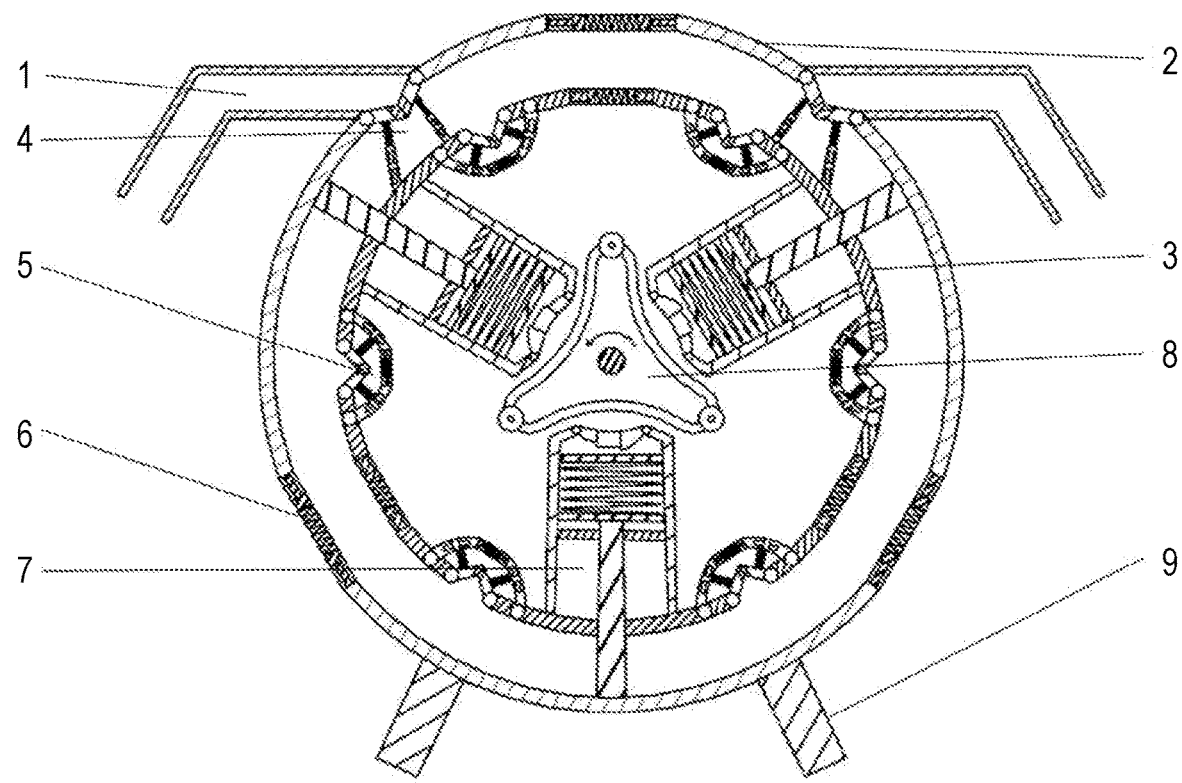
FIG. 1 is a schematic structural diagram of a front-stage inlet chamber in a self-priming apparatus for quick no-water startup according to the present disclosure.
Figure 2:
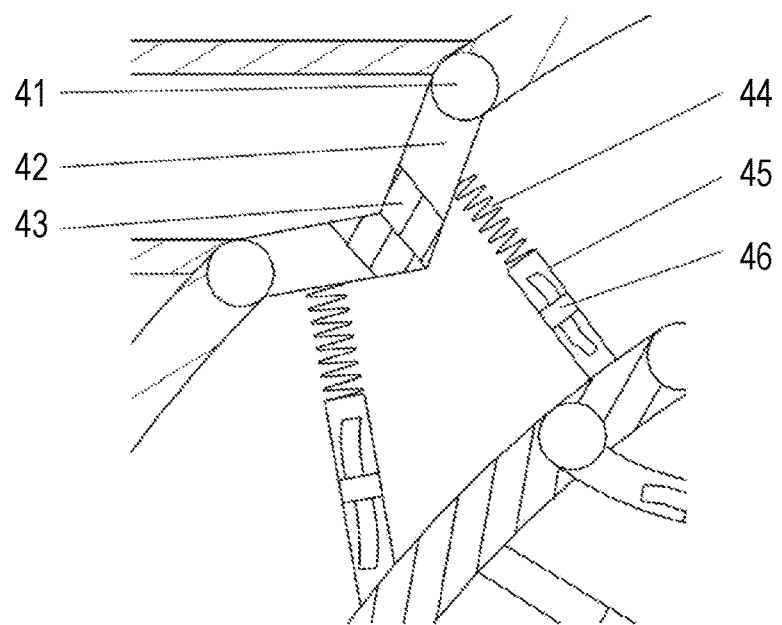
FIG. 2 is an enlarged structural diagram of a gas-liquid separation type one-way channel.
Figure 3:
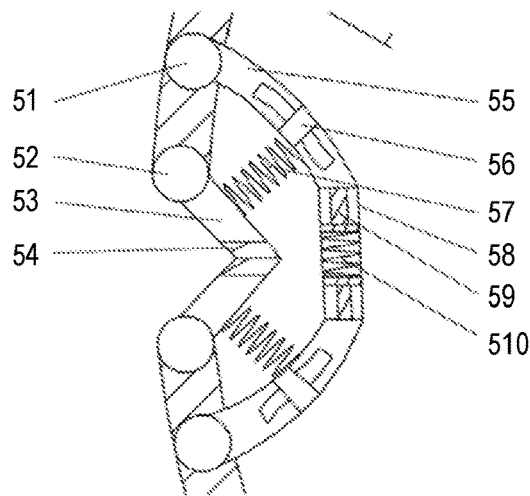
FIG. 3 is an enlarged structural diagram of a gas-liquid separation one-way opening.
Figure 4:
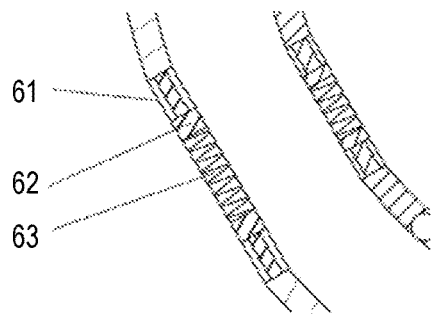
FIG. 4 is an enlarged structural diagram of a wall surface expansion device in the front-stage inlet chamber.
Figure 5:
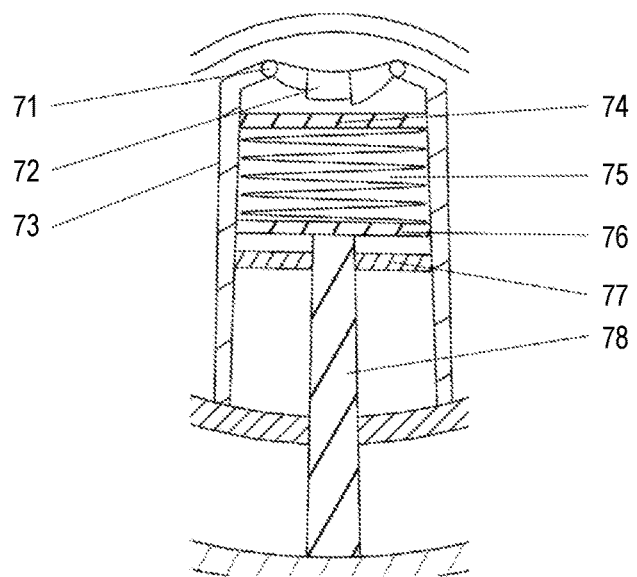
FIG. 5 is an enlarged structural diagram of a two-stage pushing shaft rod.
Figure 6:
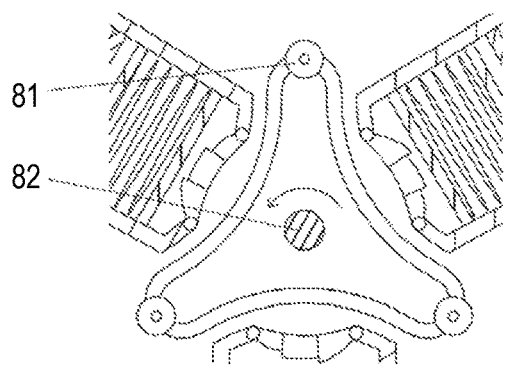
FIG. 6 is an enlarged structural diagram of a wheel-type impeller.

The present disclosure is further described below with reference to the accompanying drawings and specific embodiments, but the protection scope of the present disclosure is not limited thereto. A impeller 173 built in the inner and outer casing wall connecting device is a first inner impeller, impellers 191 built in the inner casing wall of the rear-stage gas-liquid separation chamber are second inner impellers, an impeller 222 built in the channel is a third inner impeller, an impellers 46 built in the fixed shaft rods are fourth inner impeller, impellers 56 built in the rotating shaft rods are fifth inner impellers, impellers 123 built in the inner casing wall of the middle-stage gas-liquid separation chamber are sixth inner impellers, an impeller 112 built in the fixed partition plate are a seventh inner impeller, an impeller 115 built in a slidable partition plate is an eighth inner impeller, impellers 133 built in a disc-type rolling device are ninth inner impellers, impellers 142 built in each of the gas-liquid separation channels are tenth inner impellers. A first impeller 207 in the arm rod is a first-stage impeller. A front-stage impeller 203 is a first rod impeller, a rear-stage impeller 205 is a second rod impeller. In addition, no "fourteenth-stage spring" is in the specification.

Figure 7:
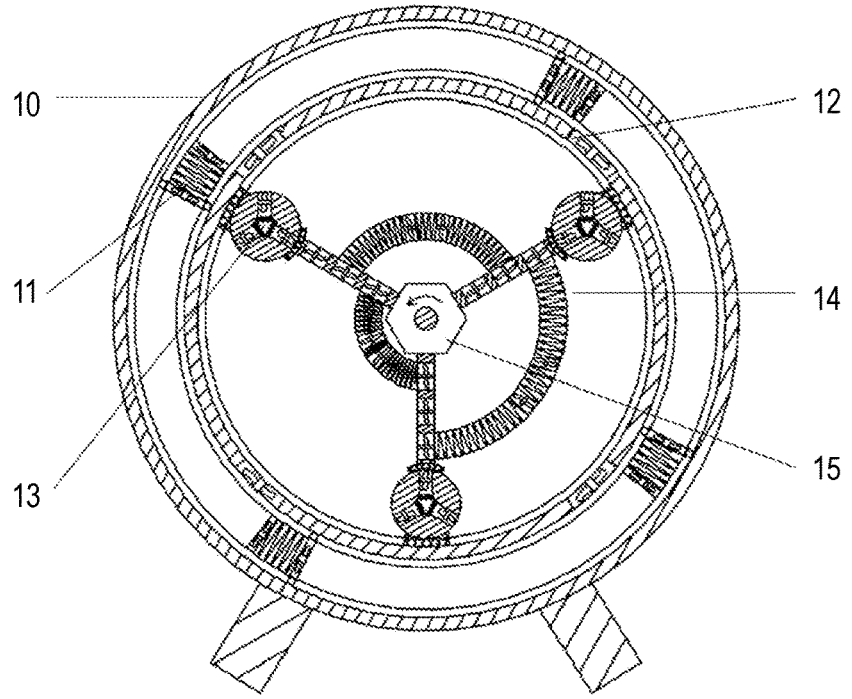
FIG. 7 is a schematic structural diagram of a middle-stage gas-liquid separation chamber in the self-priming apparatus for quick no-water startup according to the present disclosure.
Figure 8:
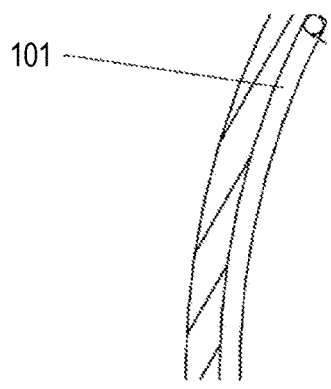
FIG. 8 is an enlarged structural diagram of an outer casing wall of the middle-stage gas-liquid separation chamber.
Figure 9:
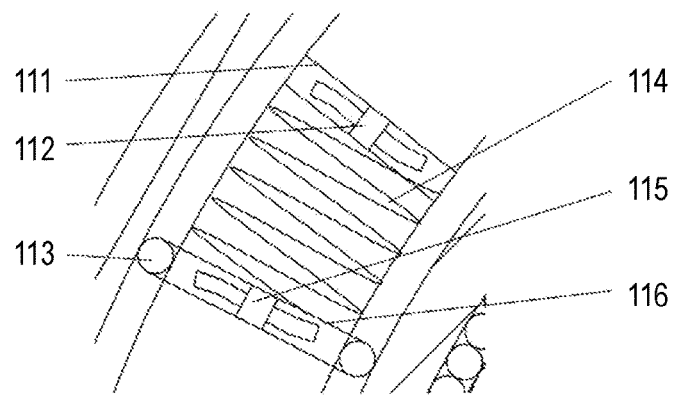
FIG. 9 is an enlarged structural diagram of a magnetically slidable chamber partition plate.
Figure 10:
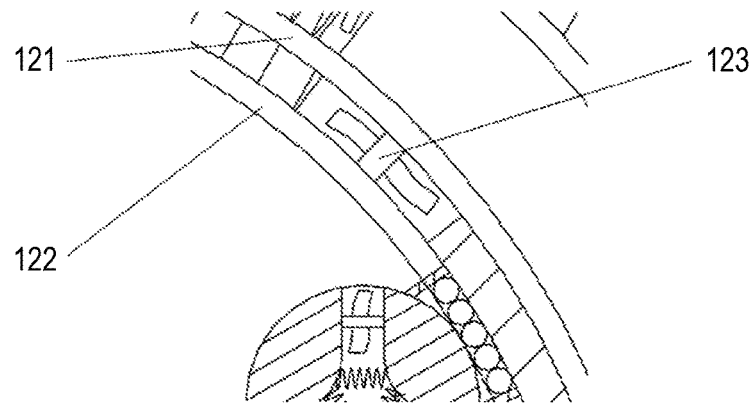
FIG. 10 is an enlarged structural diagram of an inner casing wall of the middle-stage gas-liquid separation chamber.
Figure 11:
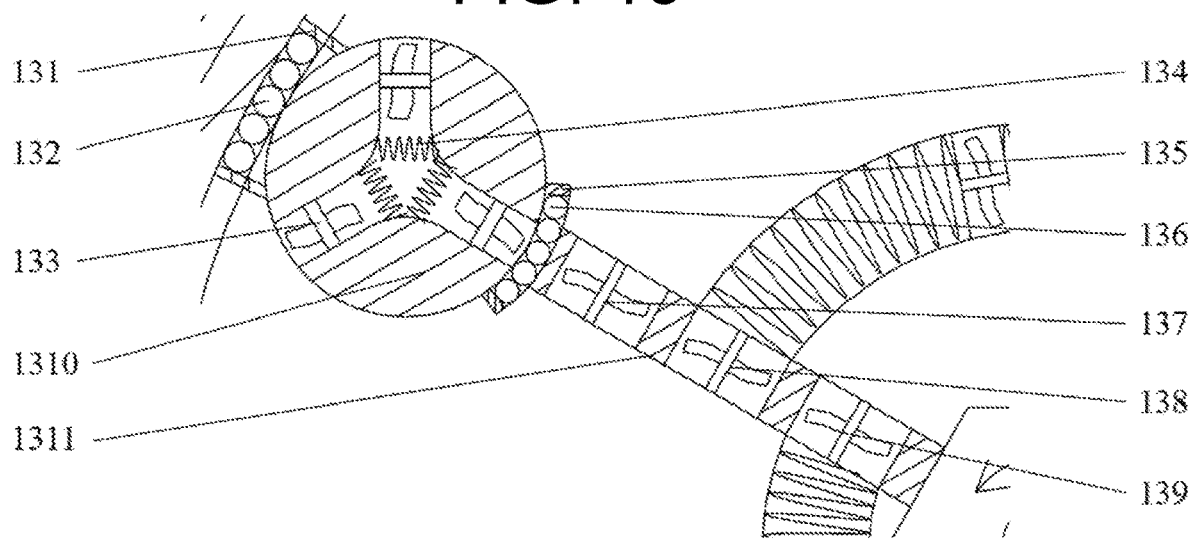
FIG. 11 is an enlarged structural diagram of a gas-liquid separation shaft.
Figure 12:
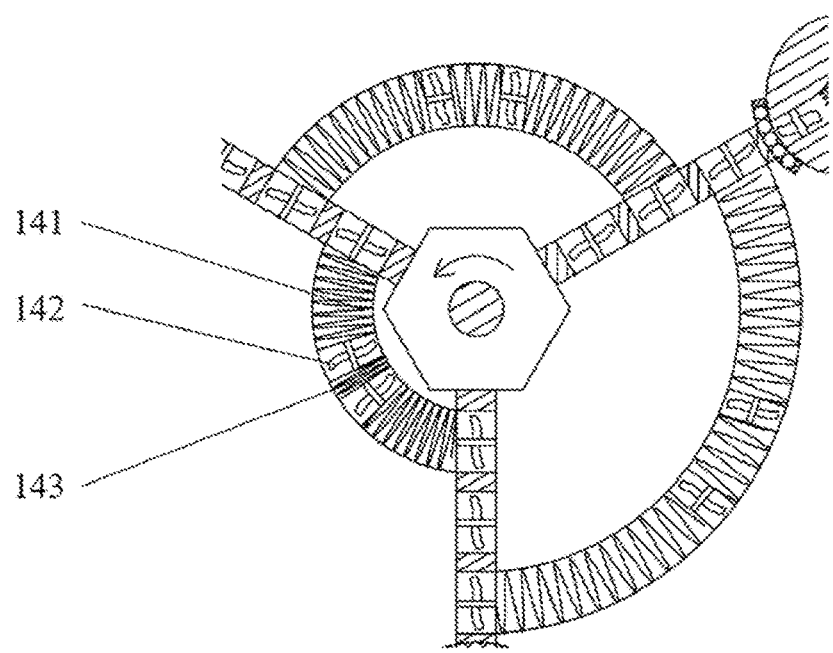
FIG. 12 is an enlarged structural diagram of gas-liquid separation channels in the middle-stage gas-liquid separation chamber.
Figure 13:
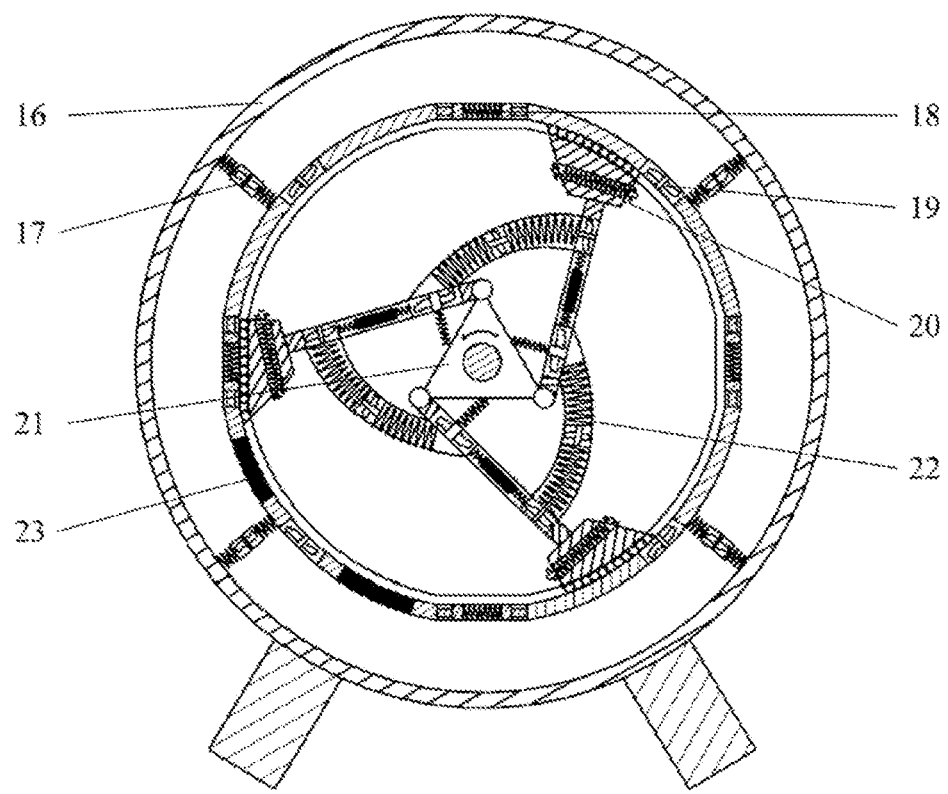
FIG. 13 is a schematic structural diagram of a rear-stage gas-liquid separation chamber in the self-priming apparatus for quick no-water startup according to the present disclosure.
Figure 14:
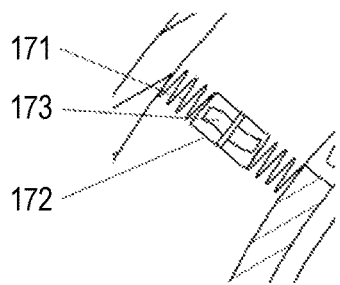
FIG. 14 is an enlarged structural diagram of an inner and outer casing wall connecting device.
Figure 15:
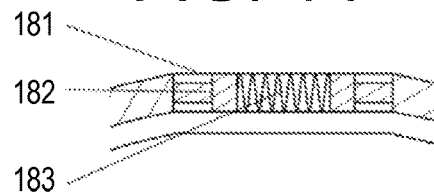
FIG. 15 is an enlarged structural diagram of an inner casing wall expansion device in the rear-stage gas-liquid separation chamber.
Figure 16:
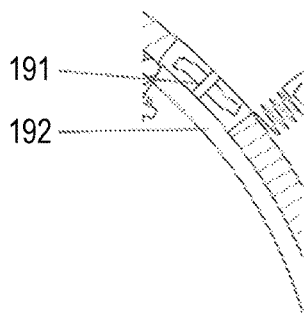
FIG. 16 is an enlarged structural diagram of an inner casing wall of the rear-stage gas-liquid separation chamber.
Figure 17:
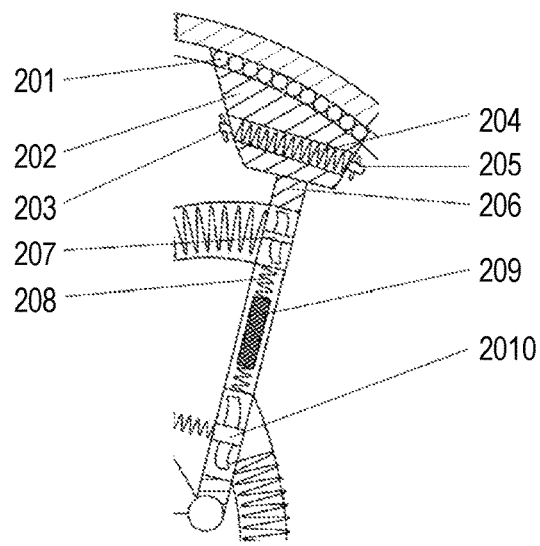
FIG. 17 is an enlarged structural diagram of a contraction-type gas-liquid separation rotating shaft rod.
Figure 18:
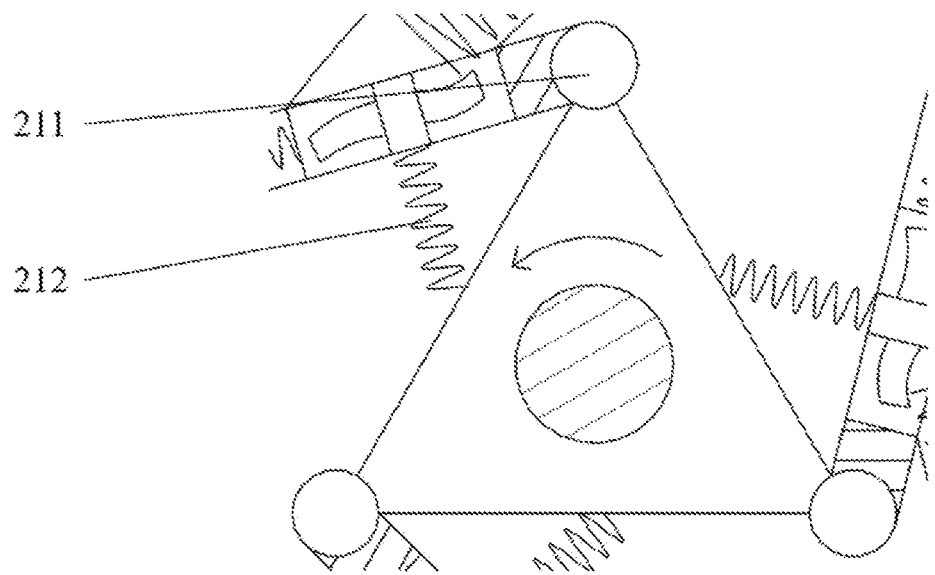
FIG. 18 is an enlarged structural diagram of a triangular impeller.
Figure 19:
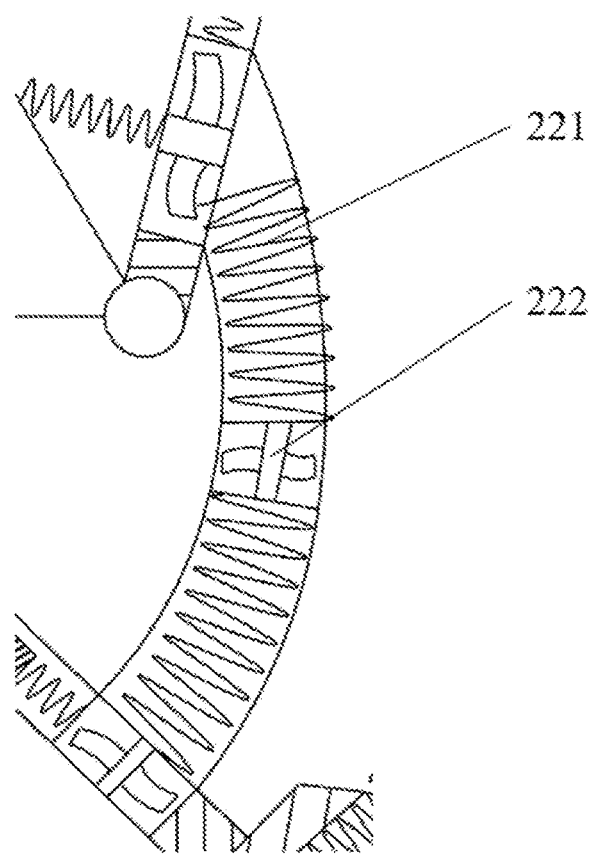
FIG. 19 is an enlarged structural diagram of a gas-liquid separation channel in the rear-stage gas-liquid separation chamber.
Figure 20:
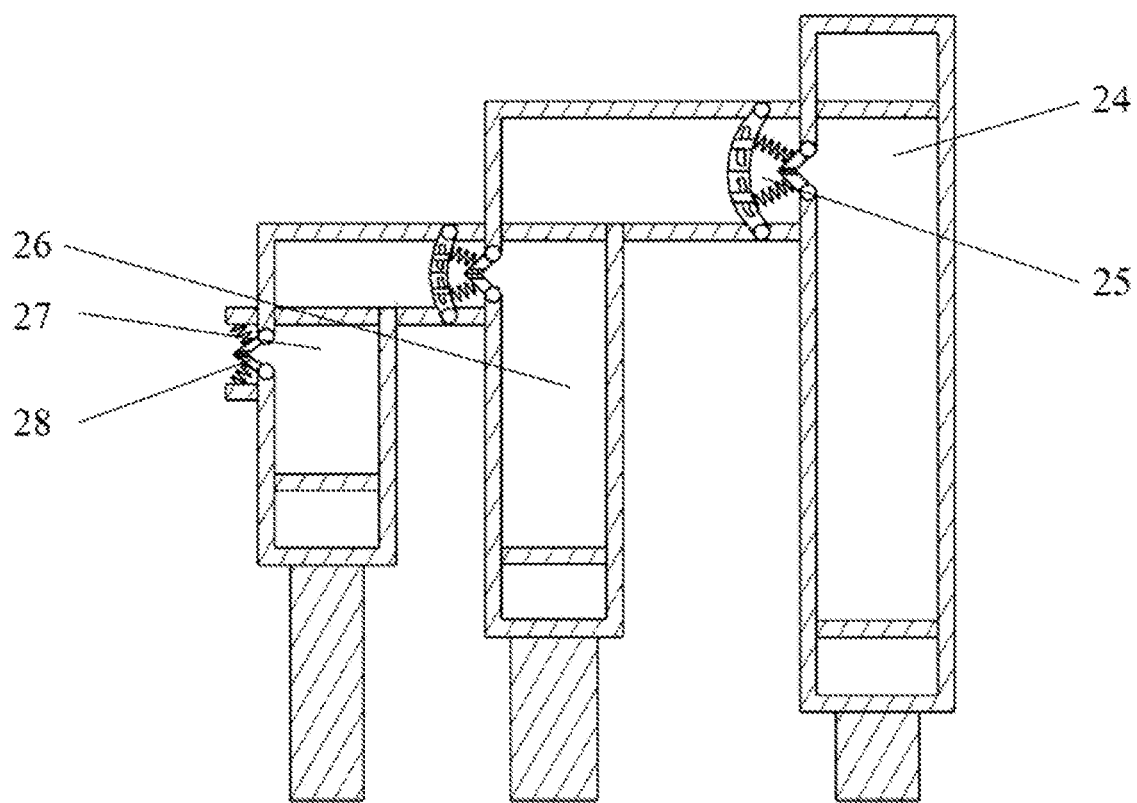
FIG. 20 is a side view of the self-priming apparatus for quick no-water startup according to the present disclosure.
Figure 21:
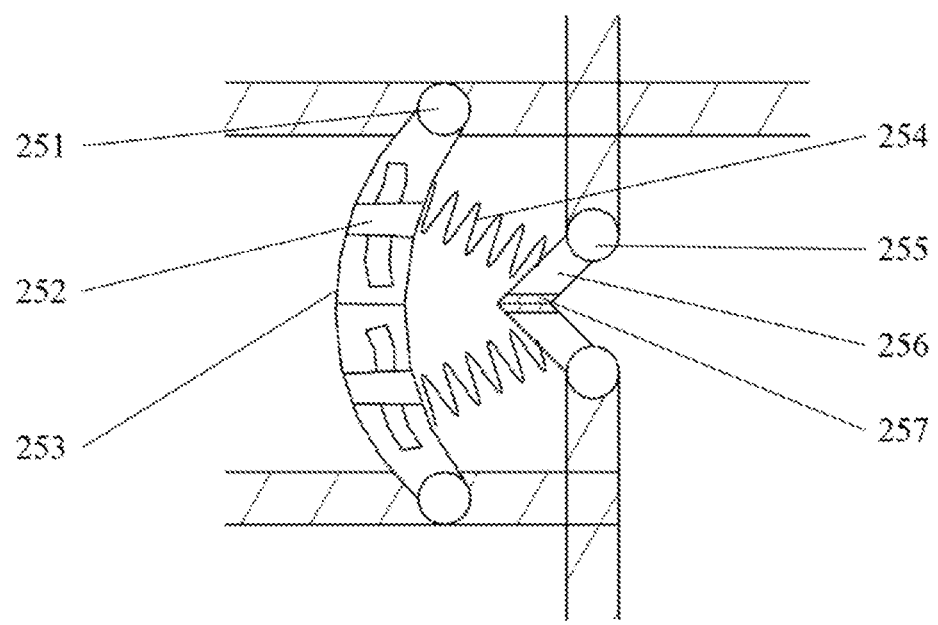
FIG. 21 is an enlarged structural diagram of a two-stage chamber gas-liquid separation one-way channel.

As shown in FIG. 1, FIG. 7, and FIG. 13, the self-priming apparatus for quick no-water startup of the present disclosure includes a structure of a symmetrical cylinder and includes a front-stage inlet chamber 24, a middle-stage gas-liquid separation chamber 26, and a rear-stage gas-liquid separation chamber 27. The front-stage inlet chamber 24 is sequentially provided from outside to inside with inlets 1, an outer casing wall 2 of the front-stage inlet chamber, gas-liquid separation type one-way channels 4, an inner casing wall 3 of the front-stage inlet chamber, a plurality of gas-liquid separation one-way openings 5, two-stage pushing shaft rods 7, and a wheel-type impeller 8. The middle-stage gas-liquid separation chamber 26 is sequentially provided from outside to inside with an outer casing wall 10 of the middle-stage gas-liquid separation chamber, a plurality of magnetically slidable chamber partition plates 11, an inner casing wall 12 of the middle-stage gas-liquid separation chamber, gas-liquid separation shafts 13, gas-liquid separation channels 14, and a hexagonal impeller 15. The rear-stage gas-liquid separation chamber 27 is sequentially provided from outside to inside with an outer casing wall 16 of the rear-stage gas-liquid separation chamber, a plurality of inner and outer casing wall connecting devices 17, an inner casing wall 19 of the rear-stage gas-liquid separation chamber, contraction-type gas-liquid separation rotating shaft rods 20, gas-liquid separation extension channels 22, and a triangular impeller 21. Two-stage chamber gas-liquid separation one-way channels 25 are arranged between adjacent chambers of the front-stage inlet chamber 24, the middle-stage gas-liquid separation chamber 26 and the rear-stage gas-liquid separation chamber 27.

Two inlets 1 are symmetrically arranged on the outer casing wall 2 of the front-stage inlet chamber, and the gas-liquid separation type one-way channel 4 is arranged at the joint between each of the inlets 1 and the outer casing wall 2 of the front-stage inlet chamber. Rotating shafts 41 of the gas-liquid separation type one-way channel, cover plates 42 of the gas-liquid separation type one-way channel, and rubber connectors 43 of the gas-liquid separation type one-way channel are symmetrically arranged on two sides of each of the gas-liquid separation type one-way channels 4, and first-stage springs 44, fixed shaft rods 45, and impellers 46 built in the fixed shaft rods are asymmetrically arranged on the two sides of the gas-liquid separation type one-way channel 4. The cover plate 42 of the gas-liquid separation type one-way channel is a rotatable cover plate and rotates along with the rotating shaft 41 of the gas-liquid separation type one-way channel. The rubber connector 43 of the gas-liquid separation type one-way channel is arranged on a top end of the cover plate 42 of the gas-liquid separation type one-way channel. The fixed shaft rod 45 is arranged on the inner casing wall 3 of the front-stage inlet chamber. The first-stage spring 44 is connected to the cover plate 42 of the gas-liquid separation type one-way channel and the fixed shaft rod 45.

The gas-liquid separation one-way openings 5 are symmetrically arranged on the inner casing wall 3 of the front-stage inlet chamber. First-stage rotating shafts 51 of the gas-liquid separation one-way opening, second-stage rotating shafts 52 of the gas-liquid separation one-way opening, cover plates 53 of the gas-liquid separation one-way opening, rubber connectors 54 of the gas-liquid separation one-way opening, rotating shaft rods 55, impellers 56 built in the rotating shaft rods, second-stage springs 57, a first wall pipe 58, first pushing shafts 59, and a third-stage spring 510 are symmetrically arranged on two sides of each of the gas-liquid separation one-way openings 5. The cover plate 53 of the gas-liquid separation one-way opening is a rotatable cover plate and rotates about the second-stage rotating shaft 52 of the gas-liquid separation one-way opening. The rotating shaft rod 55 rotates about the first-stage rotating shaft 51 of the gas-liquid separation one-way opening. The second-stage spring 57 is connected to the cover plate 53 of the gas-liquid separation one-way opening and the rotating shaft rod 55. The first pushing shaft 59 is connected to the rotating shaft rod 55 and the third-stage spring 510. The first pushing shafts 59 and the third-stage spring 510 are arranged in the first wall pipe 58.

A plurality of front-stage wall surface expansion devices 6 are evenly arranged in the outer casing wall 2 of the front-stage inlet chamber and the inner casing wall 3 of the front-stage inlet chamber. Each of the front-stage wall surface expansion devices 6 is provided with a second wall pipe 61, a fourth-stage spring 63, and second pushing shafts 62 symmetrically arranged on two sides of the fourth-stage spring 63. The second pushing shafts 62 are connected to the fourth-stage spring 63 and the wall surface. The fourth-stage spring 63 and the second pushing shafts 62 are arranged in the second wall pipe 61.

Three two-stage pushing shaft rods 7 are fixedly arranged in the front-stage inlet chamber 24. Each of the two-stage pushing shaft rods 7 is provided with a telescopic slide rail 72, a first-stage baffle 74, a fifth-stage spring 75, a second-stage baffle 76, a fixed baffle 77, and a pushing shaft rod 78, and rotating shafts 71 of the two-stage pushing shaft rod and outer casing walls 73 of the two-stage pushing shaft rod are symmetrically arranged on two sides of the two-stage pushing shaft rod 7. The outer casing walls 73 of the two-stage pushing shaft rod are connected to the inner casing wall 3 of the front-stage inlet chamber. The rotating shafts 71 of the two-stage pushing shaft rod are respectively connected to the outer casing walls 73 of the two-stage pushing shaft rod and the telescopic slide rail 72. The telescopic slide rail 72 is configured for being extended or retracted freely. The first-stage baffle 74 is a movable baffle and is located on a top of the telescopic slide rail 72. The first-stage baffle 74 is configured for sliding in the two-stage pushing shaft rod 7 and is connected to the fifth-stage spring 75. The second-stage baffle 76 is a movable baffle and is configured for sliding in the two-stage pushing shaft rod 7 and the second-stage baffle 76 is connected to the fifth-stage spring 75 and the pushing shaft rod 78. The pushing shaft rod is connected to the outer casing wall 2 of the front-stage inlet chamber. The fixed baffle 77 is fixedly arranged in the two-stage pushing shaft rod 7.

The wheel-type impeller 8 is provided with fixed wheels 81 and an external drive shaft 82 of the wheel-type impeller. Three fixed wheels 81 are provided and are respectively arranged at convex sections of the wheel-type impeller 8. The external drive shaft 82 of the wheel-type impeller is externally connected to a motor and is driven by the motor in reverse rotation. Fixed supports 9 are respectively arranged on bottom sides of the front-stage inlet chamber 24, the middle-stage gas-liquid separation chamber 26, and the rear-stage gas-liquid separation chamber 27.

The outer casing wall 10 of the middle-stage gas-liquid separation chamber is provided with a first slide rail 101. The first slide rail 101 is located on an inner side of the outer casing wall 10 of the middle-stage gas-liquid separation chamber. The inner casing wall 12 of the middle-stage gas-liquid separation chamber is provided with a second slide rail 121 and a third slide rail 122 and has a plurality of impellers 123 symmetrically built in the inner casing wall of the middle-stage gas-liquid separation chamber. The second slide rail 121 is located on an outer side of the inner casing wall 12 of the middle-stage gas-liquid separation chamber. The third slide rail 122 is located on an inner side of the inner casing wall 12 of the middle-stage gas-liquid separation chamber.

The magnetically slidable chamber partition plates 11 are evenly arranged between the outer casing wall 10 of the middle-stage gas-liquid separation chamber and the inner casing wall 12 of the middle-stage gas-liquid separation chamber. Each of the magnetically slidable chamber partition plates 11 is provided with a fixed partition plate 111, an impeller 112 built in the fixed partition plate, a sixth-stage spring 114, an impeller 115 built in a slidable partition plate, the slidable partition plate 116, and rollers 113 on two sides of the slidable partition plate 116. The fixed partition plate 111 is connected to the first slide rail 101 and the second slide rail 121 and divides an outer cavity of the middle-stage gas-liquid separation chamber 26. The sixth-stage spring 114 is connected to the fixed partition plate 111 and the slidable partition plate 116. The slidable partition plate 116 is connected to the rollers 113 on the two sides of the slidable partition plate 116, and slides via the rollers 113 and divides the outer cavity of the middle-stage gas-liquid separation chamber 26. The rollers 113 on the two sides of the slidable partition plate 116 slide along the first slide rail 101 and the second slide rail 121, respectively. The rollers are magnetized and are attracted to first wheels 132 of the gas-liquid separation shafts which are magnetized.

Three gas-liquid separation shafts 13 are arranged and divide an inner cavity of the middle-stage gas-liquid separation chamber 26. Each of the gas-liquid separation shafts 13 is provided with first wheels 132 of the gas-liquid separation shaft, impellers 133 built in a disc-type rolling device, seventh-stage springs 134, second wheels 136 of the gas-liquid separation shaft, a first impeller 137 of the gas-liquid separation shaft, a second impeller 138 of the gas-liquid separation shaft, a third impeller 139 of the gas-liquid separation shaft, the disc-type rolling device 1310, and an arm rod 1311 of the gas-liquid separation shaft. First baffles 131 of the gas-liquid separation shaft and second baffles 135 of the gas-liquid separation shaft are symmetrically arranged on two sides of the gas-liquid separation shaft, respectively. The first wheels 132 of the gas-liquid separation shaft slide along the third slide rail 122 and are connected to the first baffles 131 of the gas-liquid separation shaft on the two sides of the first wheels 132. The first wheels 132 of the gas-liquid separation shafts which are magnetized include only the first wheels 132 of one of the three gas-liquid separation shafts. The first baffles 131 of the gas-liquid separation shaft on the two sides of the first wheels 132 are connected to the disc-type rolling device 1310. Three impellers 133 are evenly built in the disc-type rolling device. Three seventh-stage springs 134 are evenly arranged in the disc-type rolling device 1310. The second wheels 136 slide along the edge of the disc-type rolling device 1310. The second baffles 135 of the gas-liquid separation shaft are connected to the second wheels 136 of the gas-liquid separation shaft and the disc-type rolling device 1310. The disc-type rolling device 1310 rotates with the hexagonal impeller 15 and is enabled to roll by the first wheels 132 of the gas-liquid separation shaft and the second wheels 136 of the gas-liquid separation shaft. The first impeller 137 of the gas-liquid separation shaft, the second impeller 138 of the gas-liquid separation shaft, and the third impeller 139 of the gas-liquid separation shaft are arranged in the arm rod 1311 of the gas-liquid separation shaft.

Three layers of the gas-liquid separation channels 14 are arranged and are constituted by the first impellers 137, the second impellers 138, and the third impellers 139 that are in one-to-one correspondence in the arm rods 1311 of the adjacent gas-liquid separation shafts, respectively. The three layers of the gas-liquid separation channels 14 are staggered and each provided with a ninth-stage spring 143 and symmetrically arranged eighth-stage springs 141 and impellers 142 built in the gas-liquid separation channel. The ninth-stage spring 143 is connected to the two symmetrically arranged impellers 142 built in the gas-liquid separation channel. The symmetrically arranged eighth-stage springs 141 are each connected to the impeller 142 built in the gas-liquid separation channel on one side and connected to a respective one of the first impeller, the second impeller and the third impeller in the arm rod 1311 of a respective one of the gas-liquid separation shafts on the other side. The hexagonal impeller 15 runs coaxially in an identical direction with the wheel-type impeller 8 and performs reverse rotation.

The inner and outer casing wall connecting devices 17 are symmetrically arranged between the outer casing wall 16 of the rear-stage gas-liquid separation chamber and the inner casing wall 19 of the rear-stage gas-liquid separation chamber. Each of the inner and outer casing wall connecting devices 17 is provided with symmetrically arranged tenth-stage springs 171, a fixed shaft rod 172 of the inner and outer casing wall connecting device, and an impeller 173 built in the inner and outer casing wall connecting device. Two ends of the fixed shaft rod 172 of the inner and outer casing wall connecting device are connected to the outer casing wall 16 and the inner casing wall 19 of the rear-stage gas-liquid separation chamber through the tenth-stage springs 171, respectively.

A plurality of rear-stage inner casing wall expansion devices 18 are evenly arranged in the inner casing wall 19 of the rear-stage gas-liquid separation chamber. Each of the rear-stage inner casing wall expansion devices 18 is provided with a third wall pipe 181, an eleventh-stage spring 183, and third pushing shafts 182 symmetrically arranged on two sides of the eleventh-stage spring 183. The third pushing shafts 182 are each connected to the eleventh-stage spring 183 and the inner casing wall 19 of the rear-stage gas-liquid separation chamber. The eleventh-stage spring 183 and the third pushing shafts 182 are arranged in the third wall pipe 181.

A plurality of impellers 191 built in the inner casing wall of the rear-stage gas-liquid separation chamber are symmetrically arranged in the inner casing wall 19 of the rear-stage gas-liquid separation chamber. A contraction-type slideway 192 is arranged on an inner side of the inner casing wall 19 of the rear-stage gas-liquid separation chamber. Two magnets 23 built in the wall surface are provided and are symmetrically arranged about a lower-side one of the impellers 191 built in the inner casing wall of the rear-stage gas-liquid separation chamber. The two magnets 23 each form an angle of 30° with the lower-side one of the impellers 191 built in the inner casing wall of the rear-stage gas-liquid separation chamber. The magnets 23 repel a magnet 209 built in a rotatable arm rod.

Three contraction-type gas-liquid separation rotating shaft rods 20 are arranged and divide an inner cavity of the rear-stage gas-liquid separation chamber 27. Each of the contraction-type gas-liquid separation rotating shaft rods 20 is provided with shaft beads 201, a trapezoidal slidable device 202, a front-stage impeller 203, a twelfth-stage spring 204, a rear-stage impeller 205, the rotatable arm rod 206, a first impeller 207 in the arm rod, thirteenth-stage springs 208 on two sides of the magnet 209, the magnet 209 built in the arm rod, and a second-stage impeller 2010 in the arm rod. The shaft beads 201 are arranged in the trapezoidal slidable device 202 and are configured for sliding along the contraction-type slideway 192. The twelfth-stage spring 204 is arranged in the trapezoidal slidable device 202. The front-stage impeller 203 is arranged at a front end of the trapezoidal slidable device 202 in the moving direction, and the rear-stage impeller 205 is arranged at a rear end of the trapezoidal slidable device 202 in the moving direction. The front-stage impeller 203 and the rear-stage impeller 205 are arranged at two sides of the twelfth-stage spring 204, respectively. The magnet 209 built in the arm rod is connected to the thirteenth-stage springs 208 on the two sides.

Three gas-liquid separation extension channels 22 are arranged and are each corresponding to the first impeller 207 and the second-stage impeller 2010 in the adjacent arm rods of the contraction-type gas-liquid separation rotating shaft rods 20. Each of the gas-liquid separation extension channels 22 is provided with an impeller 222 built in the channel and asymmetrically arranged sixteenth-stage springs 221 on two sides of the impeller 222. The sixteenth-stage spring 221 on one side is connected to the first impeller 207 in the arm rod and the impeller 222 built in the channel, and the sixteenth-stage spring 221 on the other side is connected to the second-stage impeller 2010 in the adjacent arm rod and the impeller 222 built in the channel.

The triangular impeller 21 is provided with top rotating shafts 211 and fifteenth-stage springs 212. Three top rotating shafts 211 are provided and are arranged at three vertices of the triangular impeller 21. Three fifteenth-stage springs 212 are provided and are arranged at three edges of the triangular impeller 21. The triangular impeller 21 runs coaxially in an identical direction with the wheel-type impeller 8 and performs reverse rotation.

A plurality of two-stage chamber gas-liquid separation one-way channels 25 are symmetrically arranged between the adjacent chambers. One-way channel fixed shafts 251, one-way channel built-in impellers 252, one-way channel fixed partition plates 253, seventeenth-stage springs 254, one-way channel rotating shafts 255, one-way channel cover plates 256, and one-way channel rubber connectors 257 are symmetrically arranged on two sides of each of the two-stage chamber gas-liquid separation one-way channels 25. The one-way channel fixed shafts 251 are respectively connected to the one-way channel fixed partition plates 253. The seventeenth-stage springs 254 are respectively connected to the one-way channel fixed shafts 251 and the one-way channel cover plates 256. The one-way channel rotating shafts 255 are respectively connected to the one-way channel cover plates 256, and the one-way channel cover plates 256 rotate about the one-way channel rotating shafts 255, respectively. Each of the one-way channel rubber connectors 257 is arranged on a top end of a respective one of the one-way channel cover plates 256.

A plurality of one-way outlets 28 are symmetrically arranged in the rear-stage gas-liquid separation chamber 27 and are each provided with springs, rotating shafts, rubber connectors, and cover plates. The cover plates are each a rotatable cover plate, and respectively rotate about the rotating shafts. The springs are respectively connected to the cover plates. Each of the rubber connectors is arranged on a top end of a respective one of the cover plates.

Optionally, six gas-liquid separation one-way openings 5 are provided on the inner casing wall 3 of the front-stage inlet chamber and are symmetrically arranged with respect to the chamber. The adjacent gas-liquid separation one-way openings 5 form an angle of 60°.

Optionally, the front-stage wall surface expansion devices 6 include three front-stage wall surface expansion devices 6 on the outer casing wall 2 of the front-stage inlet chamber and three front-stage wall surface expansion devices 6 on the inner casing wall 3 of the front-stage inlet chamber. The three front-stage wall surface expansion devices 6 on the inner casing wall are respectively arranged at positions corresponding to positions at which the three front-stage wall surface expansion devices 6 on the outer casing wall are arranged, and two adjacent ones of the front-stage wall surface expansion devices 6 form an angle of 120°.

Optionally, four impellers 123 are built in the inner casing wall of the middle-stage gas-liquid separation chamber and are symmetrically arranged with respect to the chamber. The adjacent impellers 123 built in the inner casing wall of the middle-stage gas-liquid separation chamber form an angle of 90°.

Optionally, four magnetically slidable chamber partition plates 11 are arranged in the middle-stage gas-liquid separation chamber 26 and are evenly distributed along the periphery of the chamber. The adjacent magnetically slidable chamber partition plates 11 form an angle of 90°.

Optionally, four inner and outer casing wall connecting devices 17 are provided in the rear-stage gas-liquid separation chamber 27 and are symmetrically arranged with respect to the chamber. The adjacent devices form an angle of 90°.

Optionally, four rear-stage inner casing wall expansion devices 18 are up-and-down symmetrically arranged in the inner casing wall 19 of the rear-stage gas-liquid separation chamber and the adjacent devices form an angle of 90°. Four impellers 191 are built in the inner casing wall of the rear-stage gas-liquid separation chamber and are symmetrically arranged with respect to the chamber. The adjacent impellers 191 form an angle of 90°.

Optionally, two pairs of the two-stage chamber gas-liquid separation one-way channels are provided, and each of the two pairs includes two two-stage chamber gas-liquid separation one-way channels 25 symmetrically arranged with respect to a respective one of the front-stage inlet chamber 24 and the middle-stage gas-liquid separation chamber 26. Two one-way outlets 28 are symmetrically arranged with respect to the rear-stage gas-liquid separation chamber.

Optionally, each of the gas-liquid separation channels 14 and an adjacent one of the gas-liquid separation shafts 13 are welded into one piece, and each of the gas-liquid separation extension channels 22 and an adjacent one of the contraction-type gas-liquid separation rotating shaft rods 20 are welded into one piece.

Optionally, the inner cavity radius of the front-stage inlet chamber 24 is the outer cavity radius of the middle-stage gas-liquid separation chamber 26, and the inner cavity radius of the middle-stage gas-liquid separation chamber 26 is the outer cavity radius of the rear-stage gas-liquid separation chamber 27, and the outer cavity radii of the three chambers 24, 26, and 27 are in a ratio of 3:2:1. In the present disclosure, the springs have high elasticity and the partition plates have good separation effects; the wheels, rollers, and shaft beads have smooth surfaces and produce small friction; and the corresponding positions of the built-in impellers allow the fluid to pass freely.

The working process of the present disclosure is as follows:

Before the apparatus is started, the two-stage pushing shaft rods 7 are at the concave sections of the wheel-type impeller 8, all the cover plates are closed, and all the springs are in the initial state. When the wheel-type impeller 8 is driven by the external drive shaft 82 of the wheel-type impeller to rotate reversely, the fixed wheels 81 at the convex sections of the wheel-type impeller 8 also rotate accordingly and contact the outer casing walls 73 of the two-stage pushing shaft rods first. The outer casing walls 73 of the two-stage pushing shaft rods receive outward pushing forces, and since the outer casing walls 73 of the two-stage pushing shaft rods are connected to the inner casing wall 3 of the front-stage inlet chamber, the inner casing wall 3 expands under the outward forces from the outer casing walls 73 of the two-stage pushing shaft rods. The fourth-stage springs 63 in the front-stage wall surface expansion devices 6 in the inner casing wall 3 of the front-stage inlet chamber are stretched, so that the volume of the inner cavity of the front-stage inlet chamber 24 increases instantly and the pressure decreases, and the volume of the outer cavity of the front-stage inlet chamber 24 decreases and the pressure increases. Therefore, the cover plates 53 of the gas-liquid separation one-way openings at the inner casing wall 3 of the front-stage inlet chamber are instantly opened inward, the second-stage springs 57 are pushed by the cover plates, and the third-stage springs 510 are stretched. Air is expelled from the outer cavity of the front-stage inlet chamber 24 into the inner cavity of the front-stage inlet chamber 24. When pressure balance is achieved between the two cavities, the cover plates 53 of the gas-liquid separation one-way openings are closed under the effect of the springs. Since the cavities are initially filled with air, the above process is a pure air process.

The wheel-type impeller 8 continues to rotate, the fixed wheels 81 at the convex sections of the wheel-type impeller 8 start to contact the telescopic slide rails 72, the rotating shafts 71 of the two-stage pushing shaft rods rotate, and the telescopic slide rails 72 extend to push the first-stage baffles 74. Since the first-stage baffles 74, the fifth-stage springs 75, the second-stage baffles 76, the pushing shaft rods 78, and the outer casing wall 2 of the front-stage inlet chamber are connected, the outer casing wall 2 of the front-stage inlet chamber expands outward, the volume of the outer cavity of the front-stage inlet chamber 24 increases and the pressure in the outer cavity of the front-stage inlet chamber 24 decreases, and the fourth-stage springs 63 in the front-stage wall surface expansion devices 6 in the outer casing wall 2 of the front-stage inlet chamber are stretched. Meanwhile, the expanded inner casing wall 3 of the front-stage inlet chamber gradually returns to the initial state under the effect of the springs, so that the volume of the outer cavity of the front-stage inlet chamber 24 further increases and the pressure in the outer cavity of the front-stage inlet chamber 24 further decreases. The initially closed cover plates 42 of the gas-liquid separation type one-way channels are opened instantly, the liquid starts to enter the outer cavity, and first-stage gas-liquid separation is carried out under the effect of the first-stage springs 44 and the impellers 46 built in the fixed shaft rods.

In the above process, since the expanded inner casing wall 3 of the front-stage inlet chamber gradually returns to the initial state under the effect of the springs, the pressure in the inner cavity of the front-stage inlet chamber 24 increases, and air is expelled into the middle-stage gas-liquid separation chamber 26 through the two-stage chamber gas-liquid separation one-way channels 25. The pressure in the middle-stage gas-liquid separation chamber 26 increases, and air is expelled into the rear-stage gas-liquid separation chamber 27 through the two-stage chamber gas-liquid separation one-way channels 25. The pressure in the rear-stage gas-liquid separation chamber 27 increases, and air is expelled out through the one-way outlets 28. When pressure balance is achieved between the chambers, the one-way channel cover plates 256 and the cover plates of the one-way outlets 28 are closed.

The wheel-type impeller 8 continues to rotate, the fixed wheels 81 at the convex sections of the wheel-type impeller 8 contact the outer casing walls 73 of the two-stage pushing shaft rods again, and the outer casing walls 73 of the two-stage pushing shaft rods receive outward pushing forces again. Since the outer casing walls 73 of the two-stage pushing shaft rods are connected to the inner casing wall 3 of the front-stage inlet chamber, the inner casing wall 3 again expands under the outward forces from the outer casing walls 73 of the two-stage pushing shaft rods. The fourth-stage springs 63 in the front-stage wall surface expansion devices 6 in the inner casing wall 3 of the front-stage inlet chamber are stretched, so that the volume of the inner cavity of the front-stage inlet chamber 24 increases instantly and the pressure decreases, and the volume of the outer cavity of the front-stage inlet chamber 24 decreases and the pressure increases. Therefore, the cover plates 53 of the gas-liquid separation one-way openings at the inner casing wall 3 of the front-stage inlet chamber are instantly opened inward, the second-stage springs 57 are pushed by the cover plates, and the third-stage springs 510 are stretched. Since the outer cavity of the front-stage inlet chamber 24 is filled with gas and liquid, the gas-liquid mixture is expelled from the outer cavity of the front-stage inlet chamber 24 into the inner cavity of the front-stage inlet chamber 24, and second-stage gas-liquid separation is carried out under the effect of the springs and the impellers in the gas-liquid separation one-way openings 5. When pressure balance is achieved between the two cavities, the cover plates 53 of the gas-liquid separation one-way openings are closed under the effect of the springs.

Finally, the wheel-type impeller 8 continues to rotate, the fixed wheels 81 at the convex sections of the wheel-type impeller 8 no longer contact the two-stage pushing shaft rods 7, the two-stage pushing shaft rods 7 gradually move to the concave sections of the wheel-type impeller 8, and the expanded inner casing wall 3 of the front-stage inlet chamber gradually returns to the initial state under the effect of the springs. Therefore, the pressure in the inner cavity of the front-stage inlet chamber 24 increases, and air is again expelled into the middle-stage gas-liquid separation chamber 26 through the two-stage chamber gas-liquid separation one-way channels 25. Since the front-stage inlet chamber is filled with the gas-liquid two-phase flow, third-stage gas-liquid separation is carried out in this process. The middle-stage gas-liquid separation chamber 26 is thus filled with gas and liquid, the pressure in the middle-stage gas-liquid separation chamber 26 increases, and air is expelled into the rear-stage gas-liquid separation chamber 27 through the two-stage chamber gas-liquid separation one-way channels 25. The pressure in the rear-stage gas-liquid separation chamber 27 increases, and air is expelled out through the one-way outlets 28. When pressure balance is achieved between the chambers, the one-way channel cover plates 256 and the cover plates of the one-way outlets 28 are closed.

The above process shows changes in the chambers when the wheel-type impeller 8 rotates by ⅓ of a circle. When the wheel-type impeller 8 continues to rotate, the coaxial triangular impeller 21 also continues to rotate. Since the contraction-type gas-liquid separation rotating shaft rods 20 are connected to the triangular impeller 21 through the fifteenth-stage springs 212, the fifteenth-stage springs 212 are stretched under the effect of the centrifugal force, the gas-liquid separation extension channels 22 are stretched, and the inner casing wall 19 of the rear-stage gas-liquid separation chamber expands. Therefore, the pressure in the inner cavity of the rear-stage gas-liquid separation chamber 27 decreases, the pressure in the outer cavity increases, and air is expelled from the outer cavity into the inner cavity.

Meanwhile, since the magnets 209 built in the arm rods repel the magnets 23 built in the wall surface, when the magnets 209 built in the arm rods rotate with the contraction-type gas-liquid separation rotating shaft rods 20 to the magnets 23 built in the wall surface, the fifteenth-stage springs 212 and the gas-liquid separation extension channels 22 contract due to repulsion of the magnets, the inner casing wall 19 of the rear-stage gas-liquid separation chamber contracts immediately, leading to an increase of the pressure in the inner cavity of the rear-stage gas-liquid separation chamber 27. Although air can pass through the impellers 191 built in the inner casing wall of the rear-stage gas-liquid separation chamber, the impellers take up a small area of the wall surface and the pressure balance cannot be maintained immediately. Air is expelled out through the one-way outlets 28, the pressure in the rear-stage gas-liquid separation chamber 27 decreases, and air is expelled from the middle-stage gas-liquid separation chamber 26 into the rear-stage gas-liquid separation chamber 27. Then, the pressure in the middle-stage gas-liquid separation chamber 26 decreases, and gas and liquid are expelled from the front-stage inlet chamber 24 into the middle-stage gas-liquid separation chamber 26, so that the pressure in the front-stage inlet chamber 24 decreases and liquid starts to enter the front-stage inlet chamber 24. Therefore, with continuous rotation of the impellers, the decrease or increase of the volume of the rear-stage gas-liquid separation chamber 27 goes along with the decrease or increase of the volume of the front-stage inlet chamber 24 to enable air exhaust and liquid intake, so that water is filled into the chambers more rapidly.

Water is continuously sucked in and the middle-stage gas-liquid separation chamber 26 is filled with the gas-liquid mixture. The wheel-type impeller 8 rotates and drives the hexagonal impeller 15 to rotate. Since the magnetically slidable chamber partition plate 11 is magnetically attracted to one of the gas-liquid separation shafts 13, the first magnetically slidable chamber partition plate rotates with the shaft, the sixth-stage spring 114 is stretched, fourth-stage gas-liquid separation is carried out, and the gas and liquid enter the inner cavity of the middle-stage gas-liquid separation chamber 26 from the outer cavity of the middle-stage gas-liquid separation chamber 26. Fifth-stage gas-liquid separation is carried out by the impellers 123 built in the inner casing wall of the middle-stage gas-liquid separation chamber during this process. The shaft continues to rotate away from the first magnetically slidable chamber partition plate and approaches the second magnetically slidable chamber partition plate. The first magnetically slidable chamber partition plate is pulled by the spring and returns to the initial state, and gas-liquid separation is carried out again. Then, the second magnetically slidable chamber partition plate rotates with the shaft and the spring is stretched. Gas-liquid separation is carried out and the gas and liquid enter the inner cavity of the middle-stage gas-liquid separation chamber 26 from the outer cavity of the middle-stage gas-liquid separation chamber 26. The third, the fourth, and again the first magnetically slidable chamber partition plate repeatedly perform the above process in cycles.

When the inner cavity of the middle-stage gas-liquid separation chamber 26 is filled with the gas-liquid mixture, the gas-liquid separation shafts 13 rotate and the disc-type rolling devices 1310 start to roll. A part of the peripheral water flows into the devices, and sixth-stage gas-liquid separation is carried out in the channels by the built-in impellers 133 and the seventh-stage springs 134 in the disc-type rolling devices. Due to the effects of rolling and the gravity, water flows out of the devices, and another part of the peripheral water flows into the

What is claimed is:

1. A self-priming apparatus for quick no-water startup, comprising a structure of a symmetrical cylinder and comprising a front-stage inlet chamber, a middle-stage gas-liquid separation chamber, and a rear-stage gas-liquid separation chamber, wherein a plurality of two-stage chamber gas-liquid separation one-way channels are symmetrically arranged between adjacent chambers of the front-stage inlet chamber, the middle-stage gas-liquid separation chamber and the rear-stage gas-liquid separation chamber, a plurality of one-way outlets are symmetrically arranged in an inner cavity of the rear-stage gas-liquid separation chamber, and fixed supports are respectively arranged on bottom sides of the front-stage inlet chamber, the middle-stage gas-liquid separation chamber, and the rear-stage gas-liquid separation chamber; by decreasing or increasing volumes of an outer cavity and an inner cavity of the front-stage inlet chamber, water is sucked in due toa pressure difference and a water intake and a preliminary gas-liquid separation are carried out; the middle-stage gas-liquid separation chamber is configured for gas-liquid separation; and by decreasing or increasing a volume of the inner cavity of the rear-stage gas-liquid separation chamber, water is rapidly expelled due to a pressure difference and a water discharge and a gas-liquid separation are carried out, wherein the rear-stage gas-liquid separation chamber is sequentially provided from outside to inside with an outer casing wall of the rear-stage gas-liquid separation chamber, a plurality of inner and outer casing wall connecting devices, an inner casing wall of the rear-stage gas-liquid separation chamber, contraction-type gas-liquid separation rotating shaft rods, gas-liquid separation extension channels, and a triangular impeller; the inner and outer casing wall connecting devices are symmetrically arranged between the outer casing wall of the rear-stage gas-liquid separation chamber and the inner casing wall of the rear-stage gas-liquid separation chamber, wherein a first inner impeller built in each of the inner and outer casing wall connecting devices is arranged in a fixed shaft rod of each of the inner and outer casing wall connecting devices, and two ends of the fixed shaft rod of each of the inner and outer casing wall connecting devices are connected to the inner casing wall and the outer casing wall through tenth-stage springs, respectively; a plurality of rear-stage inner casing wall expansion devices are evenly arranged in the inner casing wall of the rear-stage gas-liquid separation chamber; each of the rear-stage inner casing wall expansion devices is provided with a third wall pipe, an eleventh-stage spring, and third pushing shafts symmetrically arranged on two sides of the eleventh-stage spring, wherein the eleventh-stage spring and the third pushing shafts are arranged in the third wall pipe; a plurality of second inner impellers built in the inner casing wall of the rear-stage gas-liquid separation chamber are evenly distributed in the inner casing wall of the rear-stage gas-liquid separation chamber; a contraction-type slideway is arranged on an inner side of the inner casing wall of the rear-stage gas-liquid separation chamber; two magnets built in a surface of the inner casing wall of the rear-stage gas-liquid separation chamber are provided and are symmetrically arranged about a radially inner one of the second inner impellers built in the inner casing wall of the rear-stage gas-liquid separation chamber; the two magnets built in the surface of the inner casing wall of the rear-stage gas-liquid separation chamber each form an angle of 300 with the radially inner one of the second inner impellers built in the inner casing wall of the rear-stage gas-liquid separation chamber, and repel a magnet built in a rotatable arm rod; the contraction-type gas-liquid separation rotating shaft rods comprise three contraction-type gas-liquid separation rotating shaft rods and divide the inner cavity of the rear-stage gas-liquid separation chamber; each of the contraction-type gas-liquid separation rotating shaft rods is provided with shaft beads, a trapezoidal slidable device, a first rod impeller, a twelfth-stage spring, a second rod impeller, and the rotatable arm rod, wherein a first-stage impeller in the rotatable arm rod, the magnet built in the rotatable arm rod, and a second-stage impeller in the rotatable arm rod are sequentially arranged toward an axial center in the rotatable arm rod; twosides of the magnet built in the rotatable arm rod are connected to the first-stage impeller in the rotatable arm rod and the second-stage impeller in the rotatable arm rod through thirteenth-stage springs, respectively; the shaft beads are arranged in the trapezoidal slidable device and are configured for sliding along the contraction-type slideway; the twelfth-stage spring is arranged in the trapezoidal slidable device; the first rod impeller and the second rod impeller are arranged at two sides of the twelfth-stage spring, respectively; and the first rod impeller is arranged at a front end of the trapezoidal slidable device in a moving direction, and the second rod impeller is arranged at a rear end of the trapezoidal slidable device in the moving direction; the gas-liquid separation extension channels comprise three gas-liquid separation extension channels, and two ends of each of the gas-liquid separation extension channels are connected to the first impeller in the rotatable arm rod and the second-stage impeller in an adjacent rotatable arm rod to the rotatable arm rod, respectively; each of the gas-liquid separation extension channels is provided with a third inner impeller built in each of the gas-liquid separation extension channels, and two sides of the third inner impeller built in each of the gas-liquid separation extension channels are connected to the first impeller in the rotatable arm rod and the second-stage impeller in the adjacent rotatable arm rod to the rotatable arm rod through sixteenth-stage springs, respectively; the triangular impeller is provided with radially outer rotating shafts and fifteenth-stage springs, wherein the radially outer rotating shafts comprise three radially outer rotating shafts and are arranged at three vertices of the triangular impeller; the fifteenth-stage springs comprise three fifteenth-stage springs and are respectively connected to the contraction-type gas-liquid separation rotating shaft rods and the triangular impeller; the triangular impeller runs coaxially in an identical direction with a wheel-type impeller and performs a reverse rotation.

2. The self-priming apparatus for quick no-water startup according to claim 1, wherein the front-stage inlet chamber is sequentially provided from outside to inside with inlets, an outer casing wall of the front-stage inlet chamber, gas-liquid separation type one-way channels, an inner casing wall of the front-stage inlet chamber, a plurality of gas-liquid separation one-way openings, two-stage pushing shaft rods, and the wheel-type impeller; the inlets comprise two inlets and are symmetrically arranged on the outer casing wall of the front-stage inlet chamber, and a gas-liquid separation type one-way channel of the gas-liquid separation type one-way channels is arranged at a joint between each of the inlets and the outer casing wall of the front-stage inlet chamber; rotating shafts of the gas-liquid separation type one-way channel, cover plates of the gas-liquid separation type one-way channel, and rubber connectors of the gas-liquid separation type one-way channel are symmetrically arranged on two sides of each of the gas-liquid separation type one-way channels, and first-stage springs, fixed shaft rods, and fourth inner impellers built in the fixed shaft rods are asymmetrically arranged on the two sides of each of the gas-liquid separation type one-way channels, wherein each of the cover plates of the gas-liquid separation type one-way channel is a rotatable cover plate and rotates along with a respective one of the rotating shafts of the gas-liquid separation type one-way channel, each of the rubber connectors of the gas-liquid separation type one-way channel is arranged on a radially outer end of a respective one of the cover plates of the gas-liquid separation type one-way channel, the fixed shaft rods are arranged on the inner casing wall of the front-stage inlet chamber, and the first-stage springs are respectively connected to the cover plates of the gas-liquid separation type one-way channel and the fixed shaft rods; the gas-liquid separation one-way openings are symmetrically arranged on the inner casing wall of the front-stage inlet chamber; first-stage rotating shafts of each of the gas-liquid separation one-way openings, second-stage rotating shafts of each of the gas-liquid separation one-way openings, cover plates of each of the gas-liquid separation one-way openings, rubber connectors of each of the gas-liquid separation one-way openings, rotating shaft rods, fifth inner impellers built in the rotating shaft rods, second-stage springs, a first wall pipe, first pushing shafts, and a third-stage spring are symmetrically arranged on two sides of each of the gas-liquid separation one-way openings, wherein each of the cover plates of each of the gas-liquid separation one-way openings is a rotatable cover plate and rotates about a respective one of the second-stage rotating shafts of each of the gas-liquid separation one-way openings, the rotating shaft rods rotate about the first-stage rotating shafts of each of the gas-liquid separation one-way openings, respectively, the second-stage springs are respectively connected to the cover plates of each of the gas-liquid separation one-way openings and the rotating shaft rods, the first pushing shafts are respectively connected to the rotating shaft rods and the third-stage spring, and the first pushing shafts and the third-stage spring are arranged in the first wall pipe; a plurality of front-stage wall surface expansion devices are evenly arranged in the outer casing wall of the front-stage inlet chamber and the inner casing wall of the front-stage inlet chamber; each of the front-stage wall surface expansion devices is provided with a second wall pipe, a fourth-stage spring, and second pushing shafts symmetrically arranged on two sides of the fourth-stage spring, wherein the fourth-stage spring and the second pushing shafts are arranged in the second wall pipe; the two-stage pushing shaft rods comprise three two-stage pushing shaft rods and are fixedly arranged in the front-stage inlet chamber; each of the two-stage pushing shaft rods is provided with a telescopic slide rail, a first-stage baffle, a fifth-stage spring, a second-stage baffle, a fixed baffle, and a pushing shaft rod, and rotating shafts of each of the two-stage pushing shaft rods and outer casing walls of each of the two-stage pushing shaft rods are symmetrically arranged on two sides of each of the two-stage pushing shaft rods, wherein the outer casing walls of each of the two-stage pushing shaft rods are connected to the inner casing wall of the front-stage inlet chamber; the rotating shafts of each of the two-stage pushing shaft rods are respectively connected to the outer casing walls of each of the two-stage pushing shaft rods and the telescopic slide rail; the telescopic slide rail is configured for being extended or retracted freely; the first-stage baffle is a movable baffle and is located on a radially outer end of the telescopic slide rail; the first-stage baffle is configured for sliding in each of the two-stage pushing shaft rods and is connected to the fifth-stage spring; the second-stage baffle is a movable baffle and is configured for sliding in each of the two-stage pushing shaft rods, and the second-stage baffle is connected to the fifth-stage spring and the pushing shaft rod; the pushing shaft rod is connected to the outer casing wall of the front-stage inlet chamber; and the fixed baffle is fixedly arranged in each of the two-stage pushing shaft rods; and the wheel-type impeller is provided with fixed wheels and an external drive shaft of the wheel-type impeller, wherein the fixed wheels comprise three fixed wheels and are respectively arranged at convex sections of the wheel-type impeller, and the external drive shaft of the wheel-type impeller is externally connected to a motor and is driven by the motor in reverse rotation.

3. The self-priming apparatus for quick no-water startup according to claim 2, wherein the gas-liquid separation one-way openings comprise six gas-liquid separation one-way openings on the inner casing wall of the front-stage inlet chamber and are symmetrically arranged with respect to the front-stage inlet chamber; two adjacent ones of the gas-liquid separation one-way openings form an angle of 60°; and the front-stage wall surface expansion devices comprise three front-stage wall surface expansion devices on the outer casing wall of the front-stage inlet chamber and three front-stage wall surface expansion devices on the inner casing wall of the front-stage inlet chamber; the three front-stage wall surface expansion devices on the inner casing wall are respectively arranged at positions corresponding to positions at which the three front-stage wall surface expansion devices on the outer casing wall are arranged, and two adjacent ones of the front-stage wall surface expansion devices form an angle of 120°.

4. The self-priming apparatus for quick no-water startup according to claim 1, wherein the middle-stage gas-liquid separation chamber is sequentially provided from outside to inside with an outer casing wall of the middle-stage gas-liquid separation chamber, a plurality of magnetically slidable chamber partition plates, an inner casing wall of the middle-stage gas-liquid separation chamber, gas-liquid separation shafts, gas-liquid separation channels, and a hexagonal impeller;

a first slide rail is arranged on an inner side of the outer casing wall of the middle-stage gas-liquid separation chamber; a second slide rail is arranged on an outer side of the inner casing wall of the middle-stage gas-liquid separation chamber, and a third slide rail is arranged on an inner side of the inner casing wall of the middle-stage gas-liquid separation chamber; a plurality of sixth inner impellers built in the inner casing wall of the middle-stage gas-liquid separation chamber are symmetrically arranged in the inner casing wall of the middle-stage gas-liquid separation chamber; the magnetically slidable chamber partition plates are evenly arranged between the outer casing wall of the middle-stage gas-liquid separation chamber and the inner casing wall of the middle-stage gas-liquid separation chamber; each of the magnetically slidable chamber partition plates is provided with a fixed partition plate, a seventh inner impeller built in the fixed partition plate, a sixth-stage spring, an eighth inner impeller built in a slidable partition plate, the slidable partition plate, and rollers on two sides of the slidable partition plate, wherein the fixed partition plate is connected to the first slide rail and the second slide rail, and divides an outer cavity of the middle-stage gas-liquid separation chamber; the sixth-stage spring is connected to the fixed partition plate and the slidable partition plate; the slidable partition plate is connected to the rollers on the two sides of the slidable partition plate, and slides via the rollers and divides the outer cavity of the middle-stage gas-liquid separation chamber;

the rollers slide along the first slide rail and the second slide rail, respectively; the rollers are magnetized and are attracted to first wheels of the gas-liquid separation shafts which are magnetized;

the gas-liquid separation shafts comprise three gas-liquid separation shafts, namely a first gas-liquid separation shaft, a second gas-liquid separation shaft, and a third gas-liquid separation shaft, and divide an inner cavity of the middle-stage gas-liquid separation chamber; each of the gas-liquid separation shafts is provided with first wheels of each of the gas-liquid separation shafts, ninth inner impellers built in a disc-type rolling device, seventh-stage springs, second wheels of each of the gas-liquid separation shafts, a first impeller of each of the gas-liquid separation shafts, a second impeller of each of the gas-liquid separation shafts, a third impeller of each of the gas-liquid separation shafts, the disc-type rolling device, and an arm rod of each of the gas-liquid separation shafts; first baffles of each of the gas-liquid separation shafts are symmetrically arranged on two sides of the first wheels of each of the gas-liquid separation shafts, respectively, and second baffles of each of the gas-liquid separation shafts are symmetrically arranged on two sides of the second wheels of each of the gas-liquid separation shafts, respectively; the first wheels of each of the gas-liquid separation shafts slide along the third slide rail and are connected to the first baffles of each of the gas-liquid separation shafts on the two sides of the first wheels;

the first wheels of the gas-liquid separation shafts which are magnetized comprise only the first wheels of one of the three gas-liquid separation shafts; the first baffles of each of the gas-liquid separation shafts on the two sides of the first wheels are connected to the disc-type rolling device; the ninth inner impellers built in the disc-type rolling device comprise three ninth inner impellers and are evenly built in the disc-type rolling device, and the seventh-stage springs correspondingly comprise three seventh-stage springs and are correspondingly arranged in the disc-type rolling device; the second wheels slide along an edge of the disc-type rolling device and are arranged symmetrically with the first wheels of each of the gas-liquid separation shafts; the second baffles of each of the gas-liquid separation shafts are connected to the second wheels of each of the gas-liquid separation shafts and the disc-type rolling device; the disc-type rolling device rotates with the hexagonal impeller and is enabled to roll by the first wheels of each of the gas-liquid separation shafts and the second wheels of each of the gas-liquid separation shafts; the first impeller of each of the gas-liquid separation shafts, the second impeller of each of the gas-liquid separation shafts, and the third impeller of each of the gas-liquid separation shafts are arranged in the arm rod of each of the gas-liquid separation shafts;

three layers of the gas-liquid separation channels are arranged, wherein two ends of a third layer of the three layers are connected to the third impeller of the first gas-liquid separation shaft and the third impeller of the second gas-liquid separation shaft, respectively;

two ends of a second layer of the three layers are connected to the second impeller of the second gas-liquid separation shaft and the second impeller of the third gas-liquid separation shaft, respectively;

two ends of a first layer of the three layers are connected to the first impeller of the third gas-liquid separation shaft and the first impeller of the first gas-liquid separation shaft, respectively; and the three layers of the gas-liquid separation channels are each provided with a ninth-stage spring, tenth inner impellers built in each of the gas-liquid separation channels and eighth-stage springs are sequentially and symmetrically connected on two sides of the ninth-stage spring, respectively, and the other side of each of the eighth-stage springs is connected to a respective one of the first impeller, the second impeller and the third impeller in the arm rod of a respective one of the gas-liquid separation shafts; the hexagonal impeller runs coaxially in an identical direction with a wheel-type impeller and performs a reverse rotation.

5. The self-priming apparatus for quick no-water startup according to claim 4, wherein the sixth inner impellers built in the inner casing wall of the middle-stage gas-liquid separation chamber comprise four sixth inner impellers built in the inner casing wall of the middle-stage gas-liquid separation chamber and are symmetrically arranged with respect to the middle-stage gas-liquid separation chamber; two adjacent ones of the sixth inner impellers built in the inner casing wall of the middle-stage gas-liquid separation chamber form an angle of 90°; and the magnetically slidable chamber partition plates comprise four magnetically slidable chamber partition plates and are arranged in the middle-stage gas-liquid separation chamber and are evenly distributed along a periphery of the middle-stage gas-liquid separation chamber; two adjacent ones of the magnetically slidable chamber partition plates form an angle of 90°.

6. The self-priming apparatus for quick no-water startup according to claim 4, wherein each of the gas-liquid separation channels and an adjacent one of the gas-liquid separation shafts are welded into one piece in the middle-stage gas-liquid separation chamber; and each of the gas-liquid separation extension channels and an adjacent one of the contraction-type gas-liquid separation rotating shaft rods are welded into one piece in the rear-stage gas-liquid separation chamber.

7. The self-priming apparatus for quick no-water startup according to claim 1, wherein the inner and outer casing wall connecting devices comprise four inner and outer casing wall connecting devices provided in the rear-stage gas-liquid separation chamber and are symmetrically arranged with respect to the rear-stage gas-liquid separation chamber; two adjacent ones of the inner and outer casing wall connecting devices form an angle of 90°;

the rear-stage inner casing wall expansion devices comprise four rear-stage inner casing wall expansion devices up-and-down symmetrically arranged in the inner casing wall of the rear-stage gas-liquid separation chamber and two adjacent ones of the rear-stage inner casing wall expansion devices form an angle of 90°; a number of the second inner impellers built in the inner casing wall of the rear-stage gas-liquid separation chamber is four, the second inner impellers are symmetrically arranged with respect to the rear-stage gas-liquid separation chamber, and two adjacent ones of the second inner impellers built in the inner casing wall of the rear-stage gas-liquid separation chamber form an angle of 90°.

8. The self-priming apparatus for quick no-water startup according to claim 1, wherein the two-stage chamber gas-liquid separation one-way channels comprise two pairs of two-stage chamber gas-liquid separation one-way channels, each of the two pairs comprises two two-stage chamber gas-liquid separation one-way channels symmetrically arranged with respect to a respective one of the front-stage inlet chamber and the middle-stage gas-liquid separation chamber; the one-way outlets comprise two one-way outlets and are symmetrically arranged with respect to the rear-stage gas-liquid separation chamber; one-way channel fixed shafts, one-way channel built-in impellers, one-way channel fixed partition plates, seventeenth-stage springs, one-way channel rotating shafts, one-way channel cover plates, and one-way channel rubber connectors are symmetrically arranged on two sides of each of the two-stage chamber gas-liquid separation one-way channels, wherein the one-way channel fixed shafts are respectively connected to the one-way channel fixed partition plates, the seventeenth-stage springs are respectively connected to the one-way channel fixed shafts and the one-way channel cover plates, the one-way channel rotating shafts are respectively connected to the one-way channel cover plates, and the one-way channel cover plates rotate about the one-way channel rotating shafts, respectively, and each of the one-way channel rubber connectors is arranged on a radially outer end of a respective one of the one-way channel cover plates; each of the one-way outlets is provided with springs, rotating shafts, rubber connectors, and cover plates, wherein the cover plates are each a rotatable cover plate, and respectively rotate about the rotating shafts, the springs are respectively connected to the cover plates, and each of the rubber connectors is arranged on a radially outer end of a respective one of the cover plates.

9. The self-priming apparatus for quick no-water startup according to claim 1, wherein an inner cavity radius of the front-stage inlet chamber is an outer cavity radius of the middle-stage gas-liquid separation chamber, and an inner cavity radius of the middle-stage gas-liquid separation chamber is an outer cavity radius of the rear-stage gas-liquid separation chamber; and an outer cavity radius of the front-stage inlet chamber, the outer cavity radius of the middle-stage gas-liquid separation chamber, and the outer cavity radius of the rear-stage gas-liquid separation chamber is in a ratio of 3:2:1.

10. The self-priming apparatus for quick no-water startup according to claim 1, wherein each of the gas-liquid separation channels and an adjacent one of the gas-liquid separation shafts are welded into one piece in the middle-stage gas-liquid separation chamber; and each of the gas-liquid separation extension channels and an adjacent one of the contraction-type gas-liquid separation rotating shaft rods are welded into one piece in the rear-stage gas-liquid separation chamber.

* * * * *